United States Patent [19]

Tsutsumi et al.

[11] Patent Number: 5,069,476

[45] Date of Patent: Dec. 3, 1991

[54] SUSPENSION CONTROL SYSTEM

[75] Inventors: Yasuhiro Tsutsumi, Susono; Yuji Yokoya, Toyota; Yoshimichi Hara, Kuwana; Eiju Matsunaga, Anjou; Hiroyuki Kawata, Chiryu; Akira Fukami, Okazaki; Yutaka Suzuki, Nishio, all of Japan

[73] Assignees: Toyota Jidosha Kabushiki Kaisha, Toyota; Nippondenso Co., Ltd., Kariya, both of Japan

[21] Appl. No.: 520,185

[22] Filed: May 8, 1990

[30] Foreign Application Priority Data

| May 9, 1989 | [JP] | Japan | 1-115545 |
| Dec. 29, 1989 | [JP] | Japan | 1-341370 |
| Jan. 12, 1990 | [JP] | Japan | 2-4874 |

[51] Int. Cl.$^5$ ............................ B60G 11/28
[52] U.S. Cl. .................... 280/707; 280/709; 280/714
[58] Field of Search ............ 280/707, 840, 709, 714

[56] References Cited

U.S. PATENT DOCUMENTS

| 4,664,409 | 5/1987 | Nakashima et al. | 280/707 |
| 4,717,172 | 1/1988 | Asami et al. | 280/707 |
| 4,717,173 | 1/1988 | Sugasawa et al. | 280/707 |
| 4,861,068 | 8/1989 | McCabe | 280/707 |
| 4,907,154 | 3/1990 | Yasuda et al. | 280/707 |
| 4,909,536 | 3/1990 | Hale | 280/707 |

FOREIGN PATENT DOCUMENTS 0311114 4/1982 European Pat. Off. .
6238 1/1988 Japan .

Primary Examiner—Kenneth R. Rice
Attorney, Agent, or Firm—Cushman, Darby & Cushman

[57] ABSTRACT

A suspension control system controls suspensions provided for wheels of a vehicle includes a driving condition detecting part for detecting a driving condition of the vehicle, and a determination part for determining whether or not the driving condition detected by the driving condition detecting part coincides with a predetermined driving condition. The suspensions are grouped into a plurality of groups. Also the system includes a control part for separately controlling the suspensions on the basis of the driving condition when the determination part determines that the driving condition does not coincide with the predetermined driving condition and for controlling the suspensions for each of the groups so that the suspensions in an identical group are set to an identical condition when the determination part determines that the driving condition coincides with the predetermined driving condition.

25 Claims, 20 Drawing Sheets

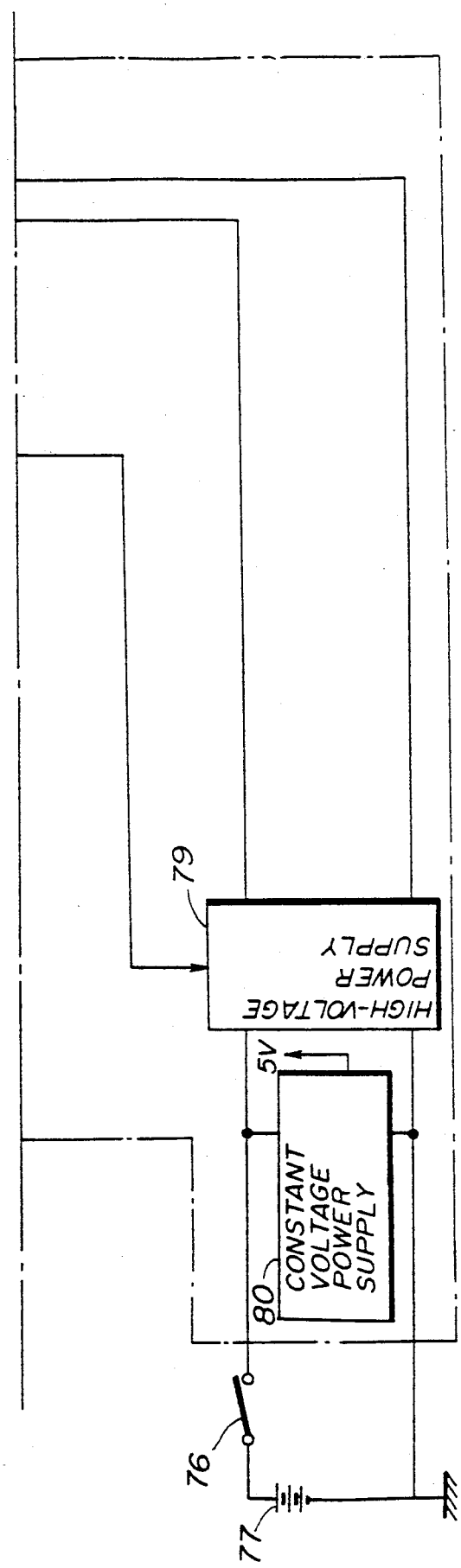

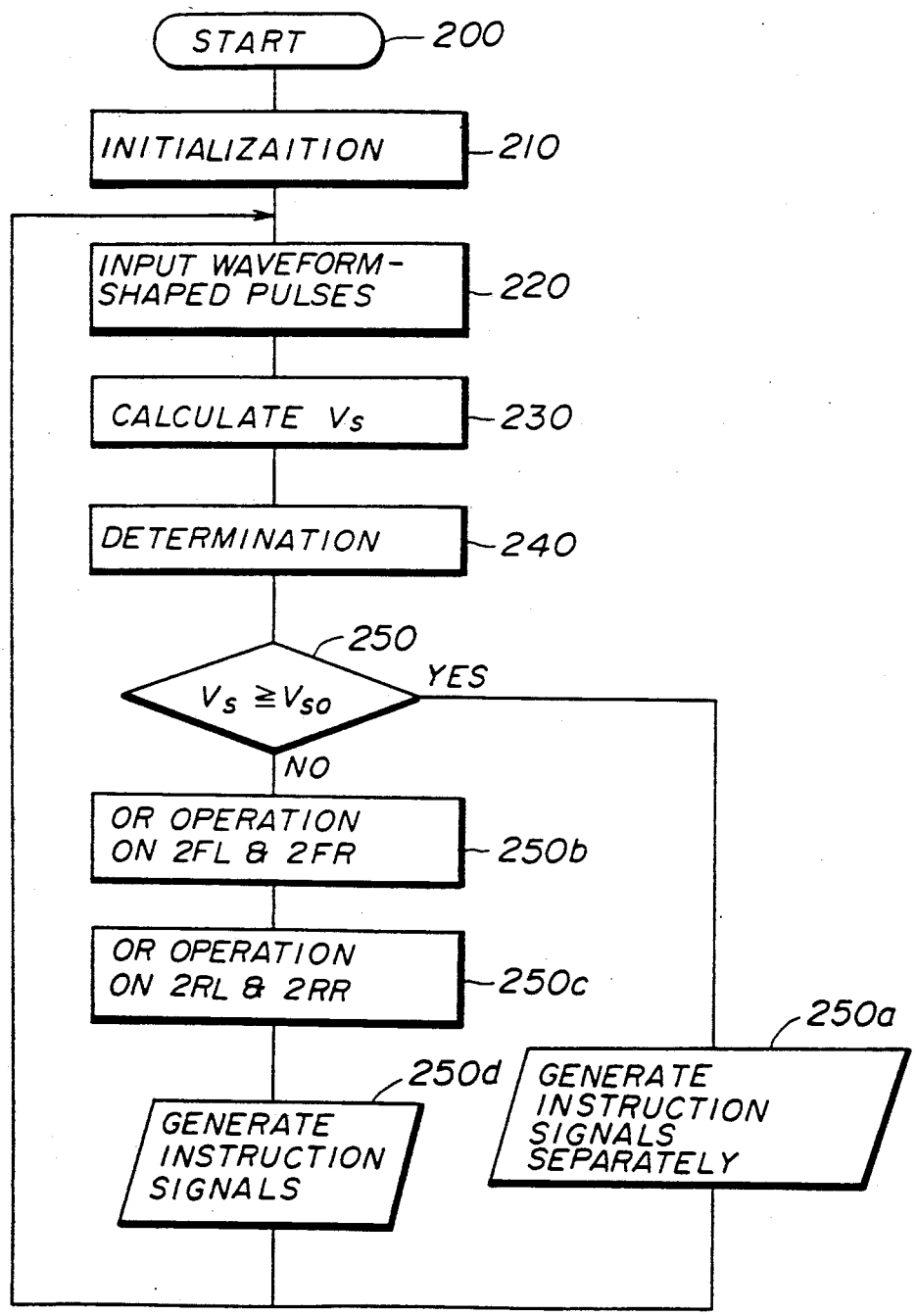

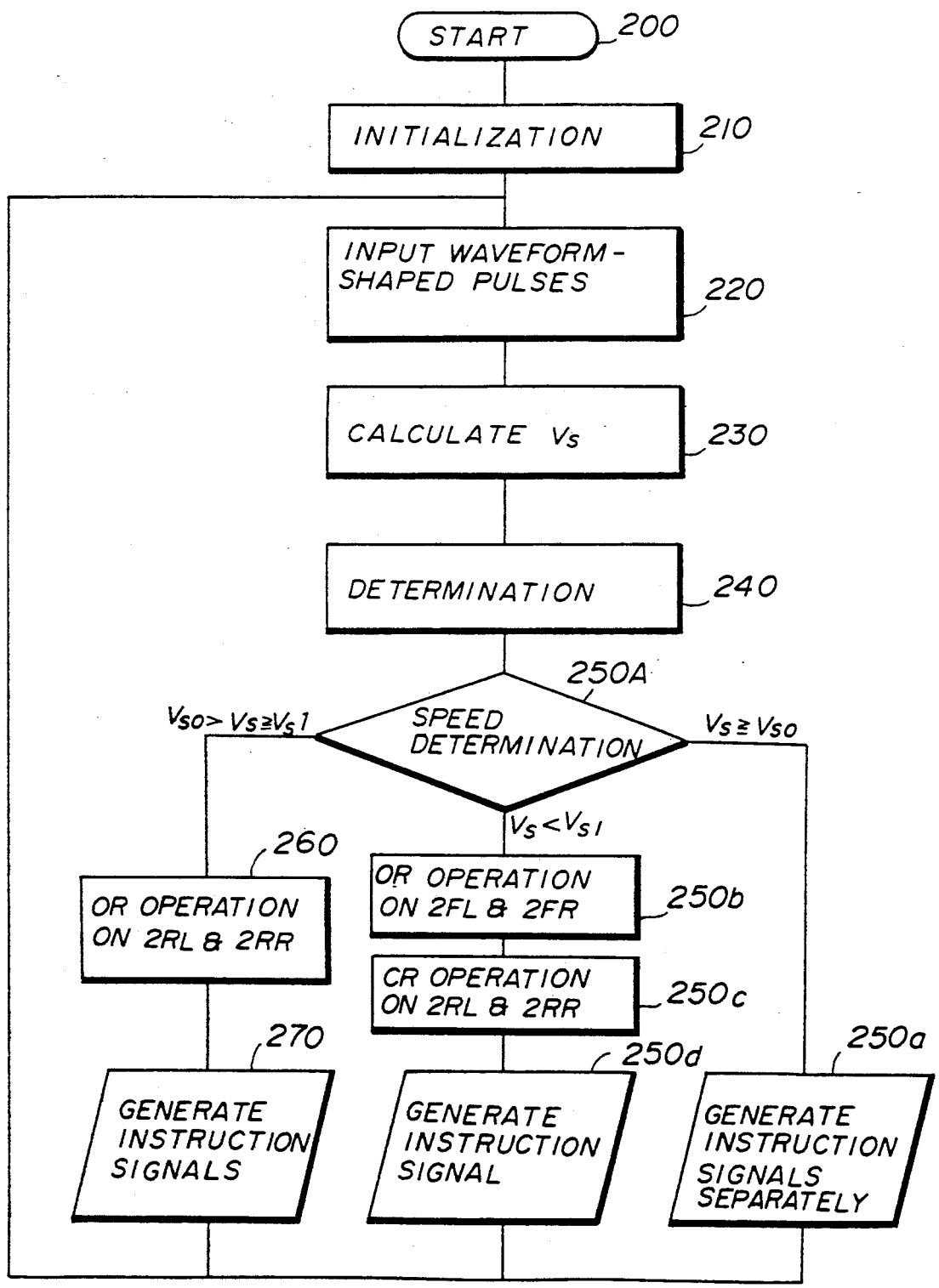

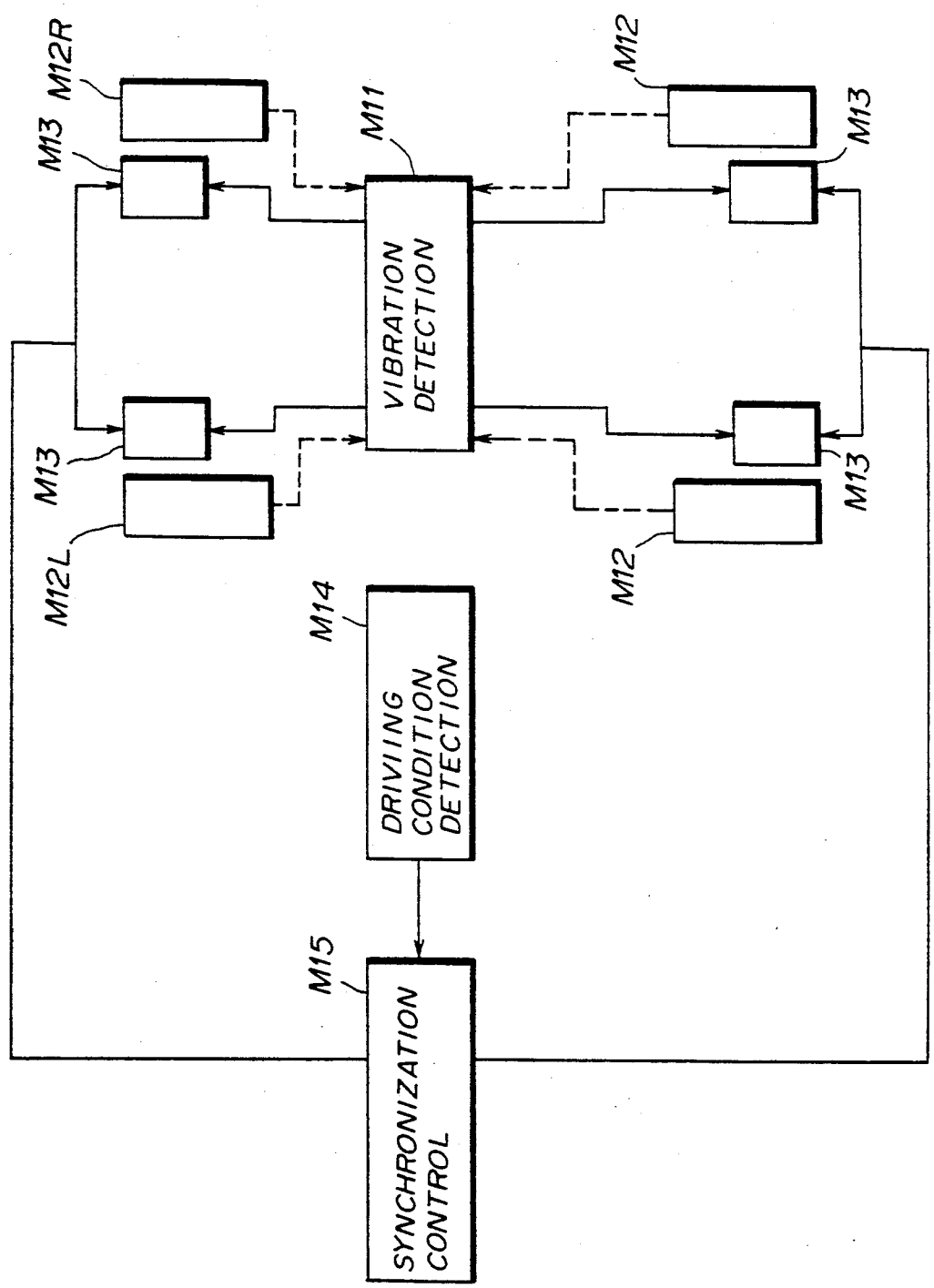

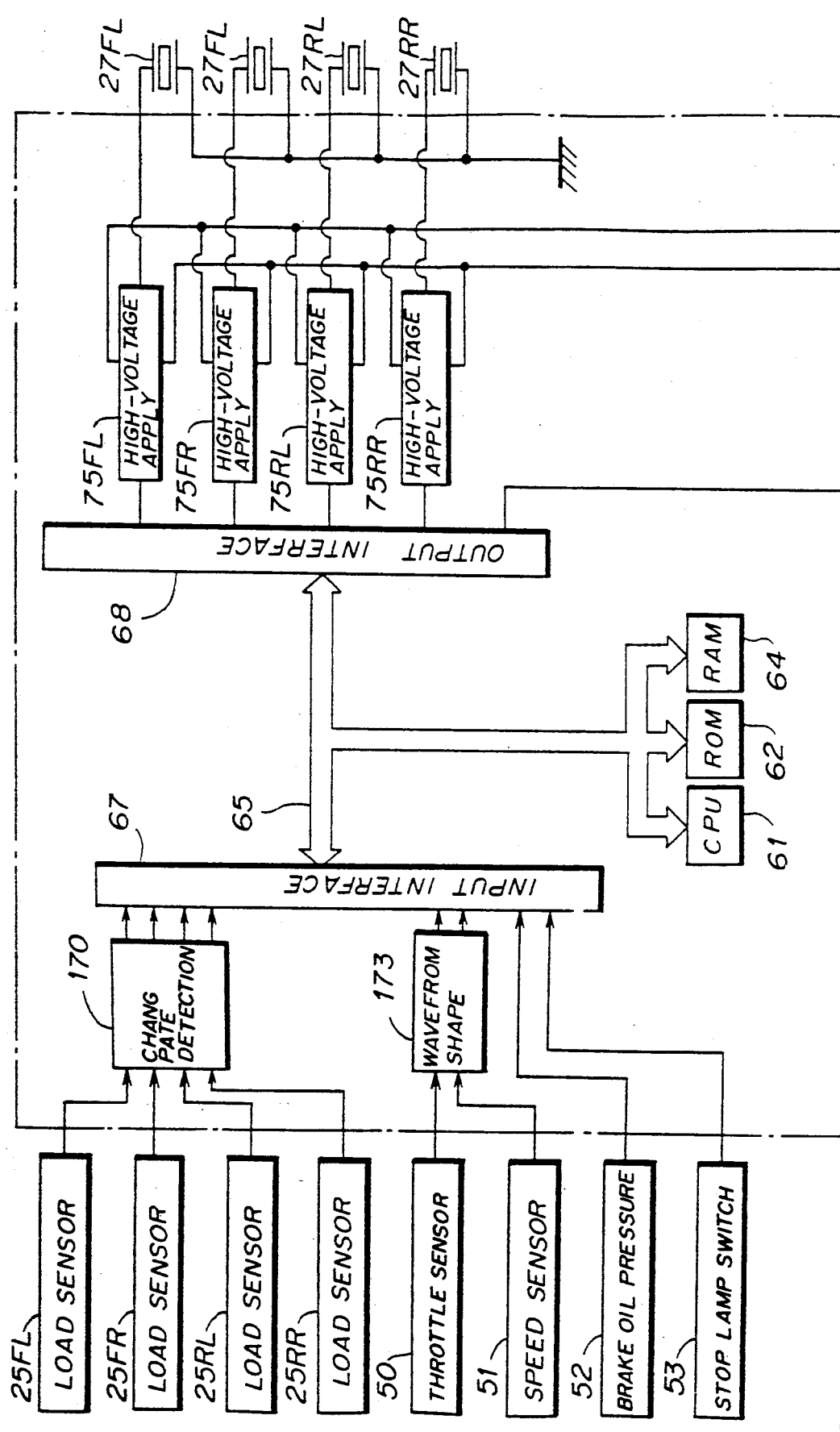

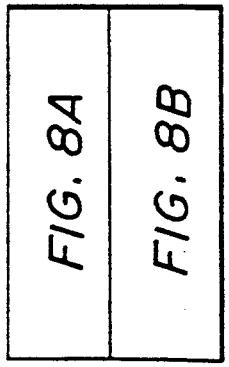
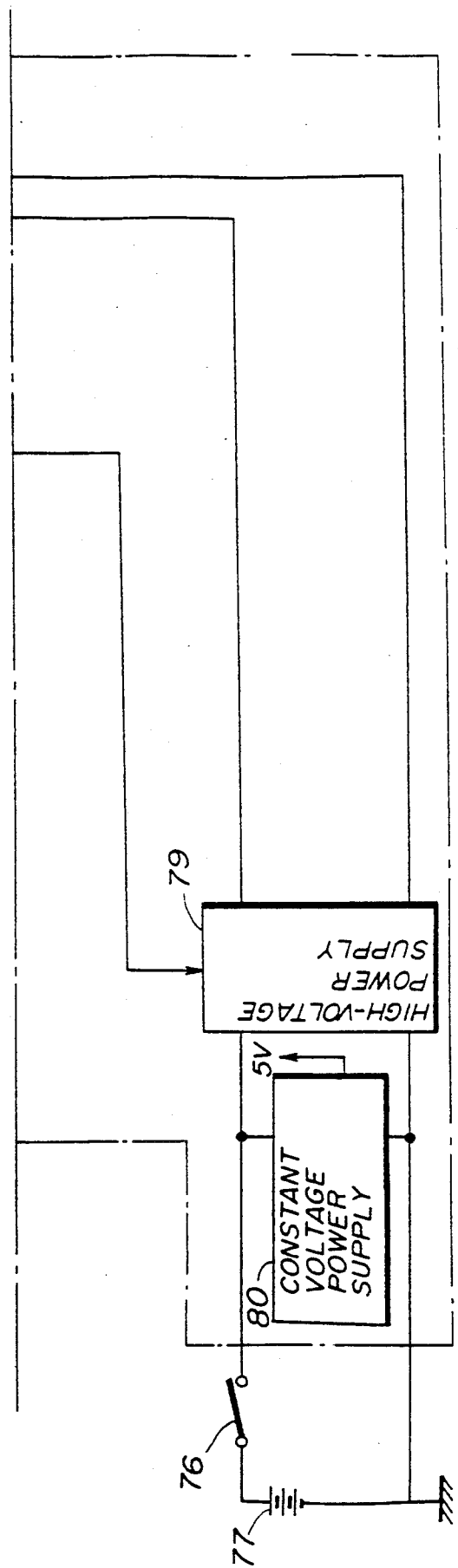

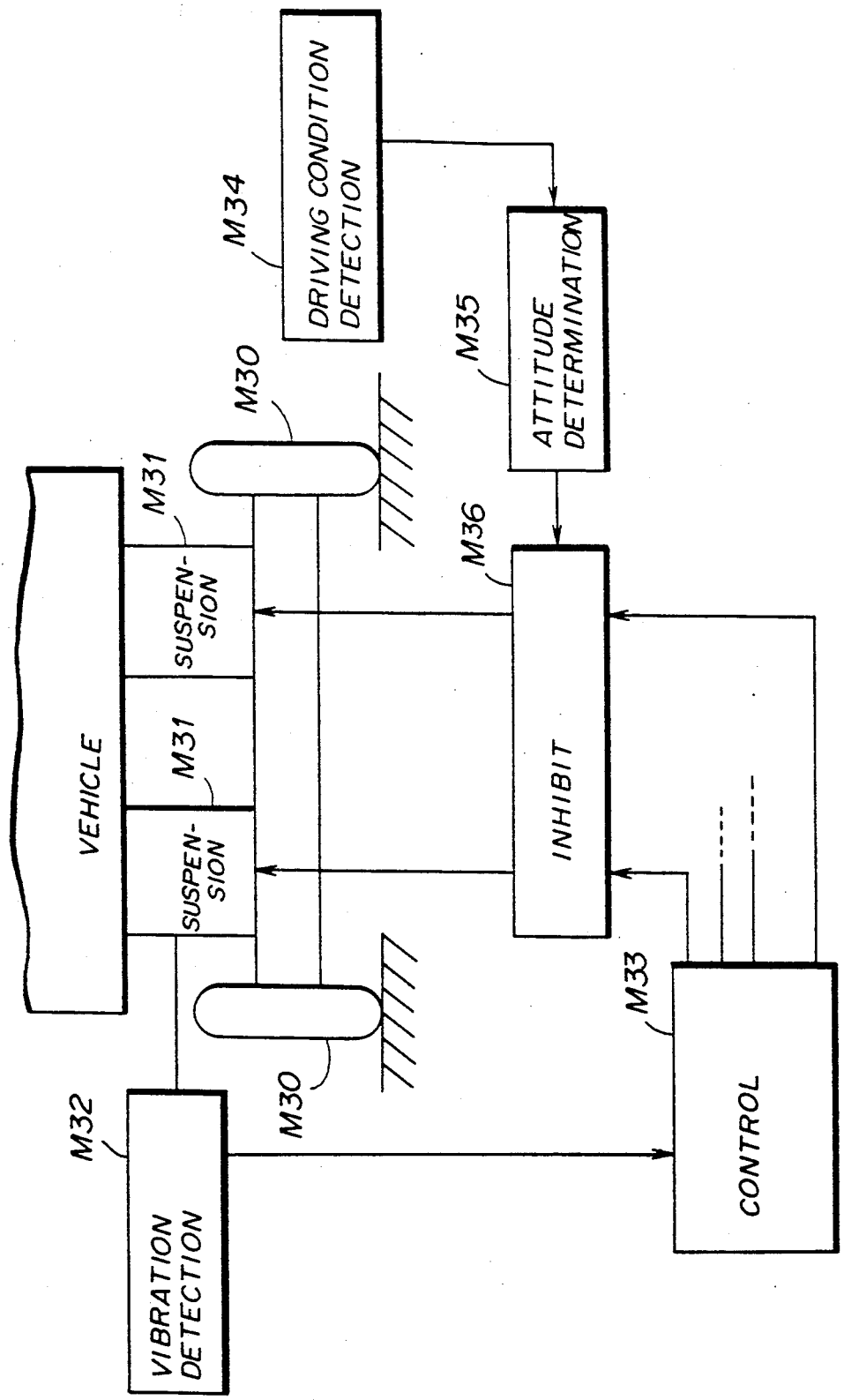

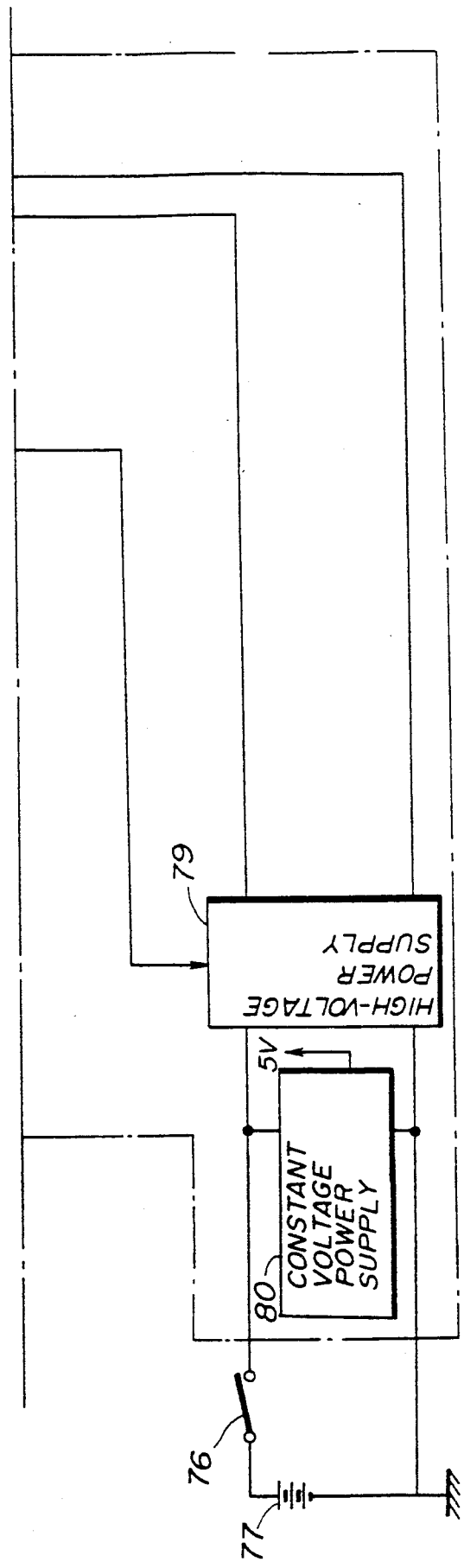

SUSPENSION CONTROL SYSTEM

BACKGROUND OF THE INVENTION (1) Field of the Invention

The present invention generally relates to a control system for controlling a suspension apparatus for use in damping force control, attitude control or vehicle height control of a vehicle. More particularly, the present invention is directed to controlling the damping force of a shock absorber or the spring constant of a suspension.

(2) Description of the Related Art

There is known a control system for controlling a variable damping force type shock absorber (see Japanese Laid-Open Patent Application No. 63-6238). A damping force of a shock absorber provided for each wheel is controlled depending on the detected level of a damping force detecting sensor attached to a corresponding one of the wheels. That is, the damping forces of the shock absorbers are separately controlled. There is also known a control system for controlling the shock absorbers or air suspensions (see Japanese Laid-Open Patent Application No. 60-148710). According to this Japanese application, when the vehicle is in the braking state, it is repeatedly determined whether or not a change in attitude of the vehicle due to pitching exceeds a predetermined level. When the determination result is affirmative, the damping forces of the shock absorbers or the spring constants of the air suspensions are separately increased so that the occurrence of a nose dive and its reaction are suppressed.

However, the above-mentioned control systems have problems arising from the fact that the shock absorbers or the air suspensions are separately controlled. There is a possibility that the balance between the damping forces related to the right and left wheels will be broken due to a rough road surface so that a rolling of the vehicle takes place. This is especially apparent when the vehicle speed is low. For example, a rolling occurs when trying to suppress a nose dive in the braking state. A rolling of the vehicle occurs when trying to suppress a squat in the rapidly accelerating state. Also, the road holding (degree of contact between each wheel and road) may be deteriorated when the damping forces of the shock absorbers are separately controlled. This affects the safety of the vehicle. The deterioration of the road holding also takes place when the spring constants of the air suspensions are separately controlled.

SUMMARY OF THE INVENTION

It is a general object of the present invention to provide an improved suspension control system in which the above-mentioned disadvantages of the present invention are eliminated.

A more specific object of the present invention is to provide a suspension control system capable of providing a much more comfortable ride.

The above-mentioned objects of the present invention are achieved by a suspension control system for controlling suspensions provided for wheels of a vehicle, comprising driving condition detecting means for detecting a driving condition of the vehicle, and determination means, coupled to the driving condition detecting means, for determining whether or not the driving condition detected by the driving condition detecting means coincides with a predetermined driving condition, the suspensions being grouped into a plurality of groups. Also the system comprises control means, coupled to the suspensions and the determination means, for separately controlling the suspensions on the basis of the driving condition when the determination means determines that the driving condition does not coincide with the predetermined driving condition and for controlling the suspensions for each of the groups so that the suspensions in an identical group are set to an identical condition when the determination means determines that the driving condition coincides with the predetermined driving condition.

The aforementioned objects of the present invention are also achieved by a suspension control system for controlling suspensions provided for wheels of a vehicle, comprising driving condition detecting means for detecting a driving condition of the vehicle, and determination means, coupled to the driving condition detecting means, for determining whether or not the driving condition detected by the driving condition detecting means coincides with a predetermined driving condition, the suspensions being grouped into a plurality of groups, each of the suspensions being switchable between a hard state and a soft state. The system also comprises control means, coupled to the suspensions and the determination means, for separately controlling the suspensions on the basis of the driving condition when the determination means determines that the driving condition does not coincide with the predetermined driving condition and for controlling the suspensions for each of the groups so that at least one of the suspensions in an identical group is set to the hard state when the determination means determines that the driving condition coincides with the predetermined driving condition.

BRIEF DESCRIPTION OF THE DRAWINGS

Other objects, features and advantages of the present invention will become apparent from the following detained description when read in conjunction with the accompanying drawings, in which:

FIG. 4 is a block diagram how to combine FIGS. 4A and 4B;

FIGS. 4A and 4B are block diagrams of a detailed structure of the suspension control system shown in FIG. 1;

FIG. 5 is a flowchart showing the operation of the system shown in FIGS. 4A and 4B;

FIG. 6 is a flowchart showing the operation of a variation of the operation shown in FIG. 5;

FIG. 7 is a block diagram illustrating the principle of a suspension control system according to a second preferred embodiment of the present invention;

FIG. 8 is a block diagram showing how to combine FIGS. 8A and 8B;

FIGS. 8A and 8B are block diagrams of a detailed structure of the suspension control system shown in FIG. 7;

FIG. 13 is a block diagram illustrating the principle of a suspension control system according to a third preferred embodiment of the present invention;

FIG. 14 is a block diagram illustrating how to combine FIGS. 14A and 14B;

FIGS. 14A and 14B are block diagrams of a detained structure of the third embodiment of the present invention shown in FIG. 13:

DESCRIPTION OF THE PREFERRED EMBODIMENTS

Figure 1:
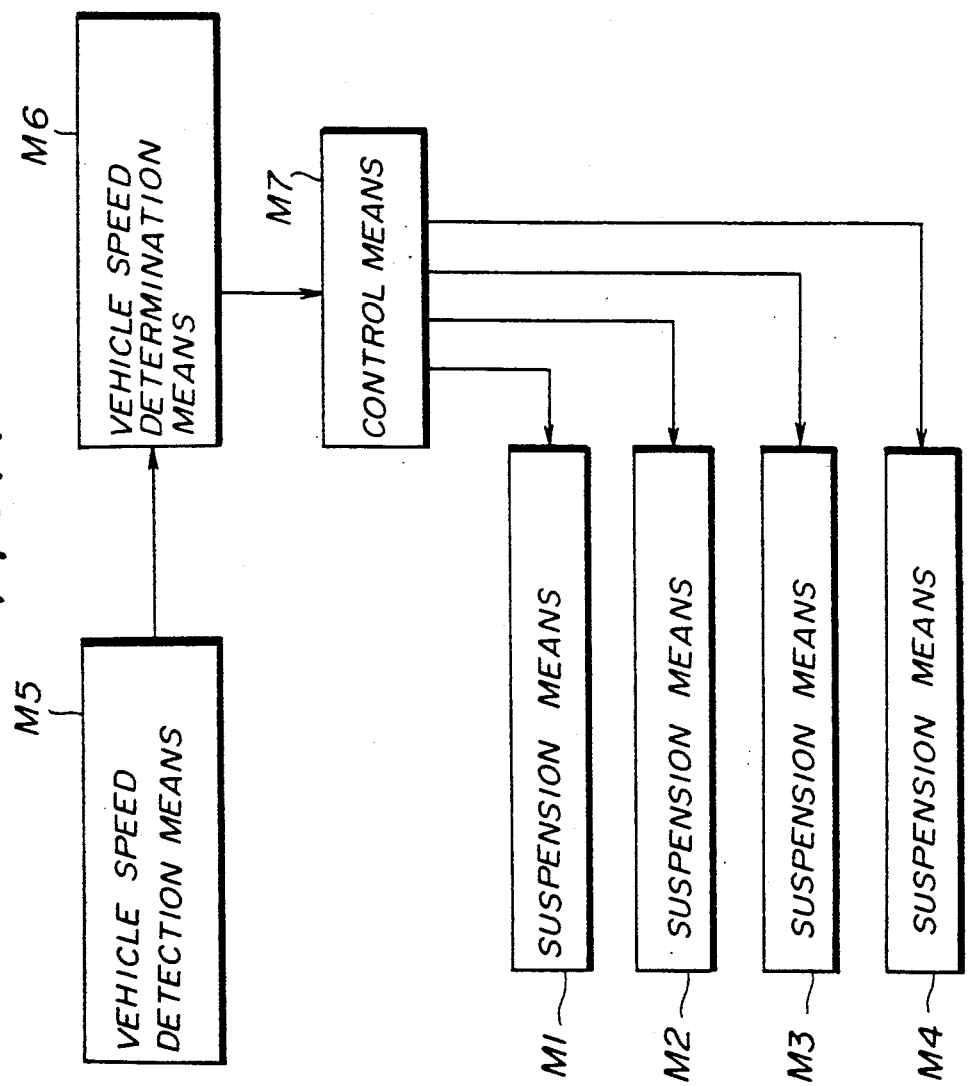
FIG. 1 is a block diagram of a general structure of a suspension control system according to a first preferred embodiment of the present invention.

A description will now be given of the principle of a suspension control system according to a first preferred embodiment of the present invention. Referring to FIG. 1, there is illustrated a general structure of the first embodiment of the present invention. A suspension control system controls four suspension means M1, M2, M3 and M4, and includes a vehicle speed detecting means M5, a vehicle speed determination means M6 and a control means M7. The suspension means M1 is provided between the body of a vehicle body and a left front wheel. The suspension means M2 is provided between the vehicle body and a right front wheel. The suspension means M3 is provided between the vehicle body and a left rear wheel. The suspension means M4 is provided between the vehicle body and a right rear wheel. Each of the suspension means M1-M4 includes a shock absorber. The vehicle speed detecting means M5 detects the speed of the vehicle. The vehicle speed determination means M6 determines which one of the three speed ranges, high-speed range, intermediate-speed range or low-speed range, the current vehicle speed belongs to. It will be noted the present system is not limited to the above-mentioned three speed ranges. When it is determined that the vehicle speed is high, the control means M7 controls the suspension means M1 and M2 provided for the front wheels so that the damping forces of the shock absorbers included in the suspension means M1 and M2 and/or the spring constants of the suspension means M1 and M2 are identical to each other, and controls the suspension means M3 and M4 provided for the rear wheels so that the damping forces of the shock absorbers included in the suspension means M3 and M4 and/or the spring constants of the suspension means M3 and M4 are identical to each other. With this control, it becomes possible to control the vehicle attitude on the front-wheel side by setting the shock absorbers related to the front wheels to an identical damping force and control the vehicle attitude on the rear-wheel side by setting the shock absorbers related to the rear wheels to an identical damping force. Thus, the occurrence of rolling can be prevented.

When the vehicle speed determination means M6 determines that the vehicle speed is in the intermediate-speed range, the control means M7 controls the suspension means M3 and M4 so that the damping force of each of the shock absorbers related to the rear wheels or the spring constant of each of the air suspensions related thereto is set to the same damping force as each other. On the other hand, the control means M7 controls the suspension means M1 and M2 separately from each other.

Figure 2:
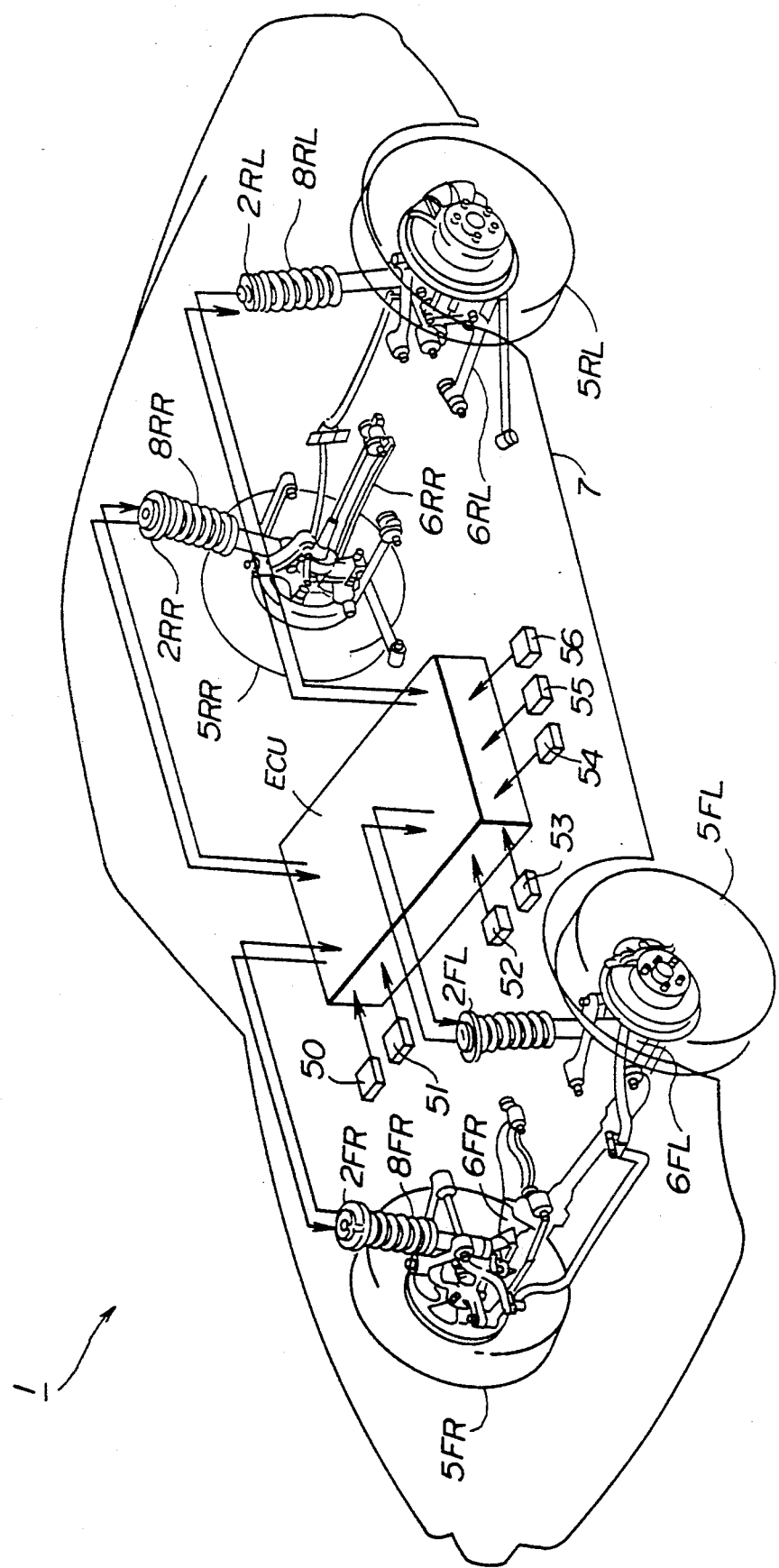
FIG. 2 is a perspective view of a vehicle in which a suspension control system according to the present invention is installed.

A description will now be given of a detailed structure of the first embodiment of the present invention with reference to FIG. 2, which shows that the suspension control system according to the first preferred embodiment of the present invention is applied to variable damping force type shock absorbers 2FL, 2FR, 2RL, 2RR which are suspensions provided in a vehicle 1. The damping force of each of the shock absorbers 2FL, 2FR, 2RL and 2RR is switchable between a first level (SOFT) and a second level (HARD). The shock absorber 2FL is provided between a vehicle body 7 and a suspension lower arm 6FL for a left front wheel 5FL. The shock absorber 2FR is provided between the vehicle body 7 and a suspension lower arm 6FR for a right front wheel 5FR. The shock absorber 2RL is provided between the vehicle body 7 and a suspension lower arm 6RL for a left rear wheel 5RL. The shock absorber 2RR is provided between the vehicle body 7 and a suspension lower arm 6RR for a right rear wheel 5RR. Each of the shock absorbers 2FL, 2FR, 2RL and 2RR includes a built-in piezoelectric load sensor and a piezoelectric actuator pair. The piezoelectric load sensors in the shock absorbers 2FL, 2FR, 2RL and 2RR detect force exerted on the shock absorbers 2FL, 2FR, 2RL and 2RR, respectively. The piezoelectric actuators in the shock absorbers 2FL, 2FR, 2RL and 2RR function to switch the damping forces thereof between the first level and the second level.

A description will now be given of the shock absorbers 2FL, 2FR, 2RL and 2RR. Since all the shock absorbers 2FL, 2FR, 2RL and 2RR are of the same structure, only the shock absorber 5FL provided for the left front wheel is described for the sake of convenience. It will be noted that when there is no difference among the four shock absorbers, suffixes such as FL, FR, RL and RR are omitted.

Figure 3A:
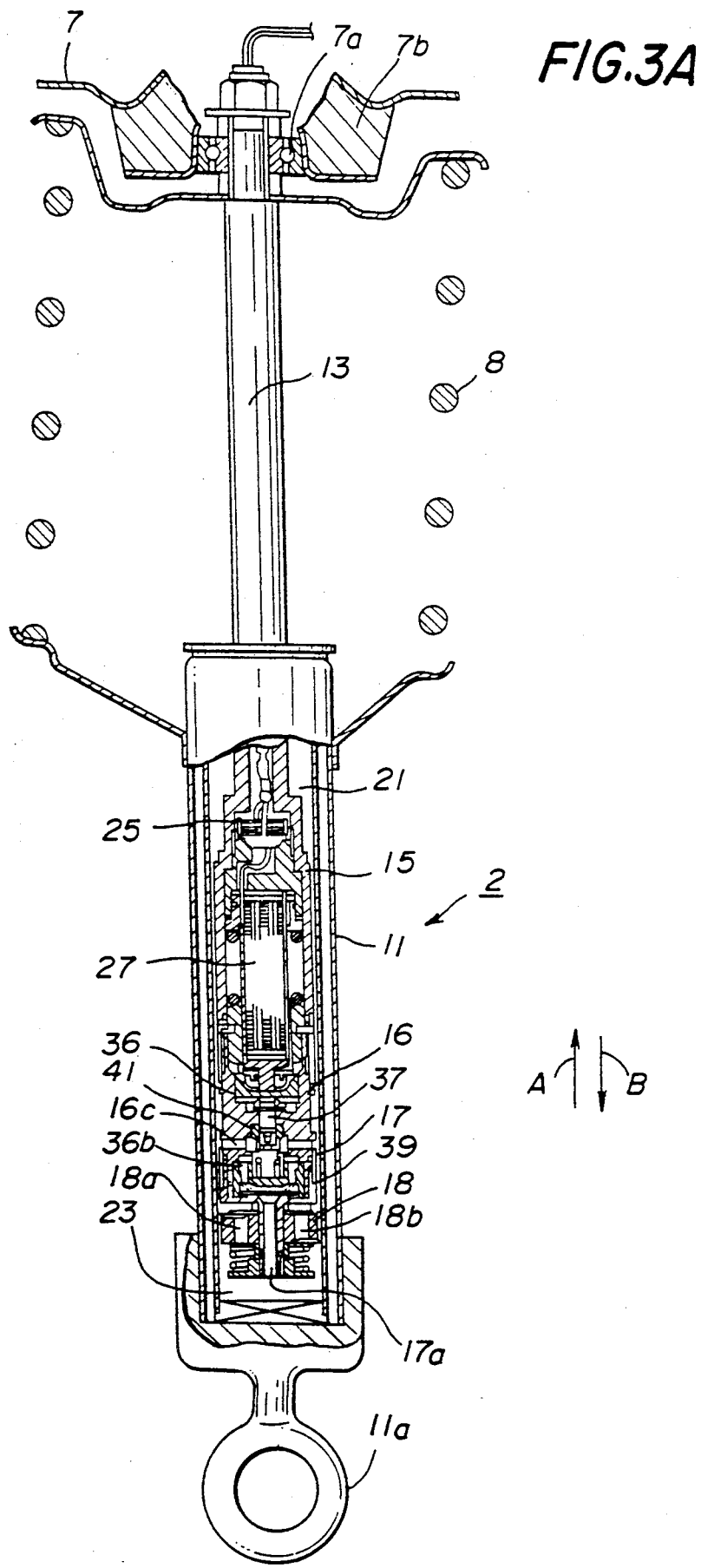
FIG. 3A is a partially sectional view of a shock absorber used in the vehicle shown in FIG. 2.

As shown in FIG. 3A, the shock absorber 2 is fixed to a suspension lower arm 6 through a wheel-shaft-side member 11a at a lower end of a cylinder 11. On the other hand, the shock absorber 2 is fixed, together with a coil spring 8, to the vehicle body 7 through a bearing 7a and a rubber element 7b at an upper end of a rod 13 which penetrates into the cylinder 11. Inside the cylinder 11, there are provided an internal cylinder 15, a connecting member 16 and a cylindrical member 17 which are coupled to the lower end of the rod 13, as well as a main piston 18 which is slidable along an inner surface of the internal cylinder 15. A piezoelectric load sensor 25 and a piezoelectric actuator 27 are accommodated in the internal cylinder 15 connected to the rod 13 of the shock absorber 2.

The main piston 18 is provided outside of the cylindrical member 17 and engages therewith. A seal member 19 is provided between an circumferential outer surface of the main piston 18 and the inner surface of the internal cylinder 15. An internal area of the cylinder 11 is separated into a first liquid room 21 and a second liquid room 23 by the main piston 18. A backup member 28 is provided on the leading end of the cylindrical member 17. The backup member 28 presses a spacer 29 and a leaf valve 30 against the cylindrical member 17 together with the main piston 18. In this state, the spacer 29 and the leaf valve 30 are fixed. A leaf valve 31 and a collar 32 are provided between the backup member 28 and the main piston 18. The leaf valve 31 and the collar 32 are pressed against the backup member 28 and fixed thereto in this state. A main valve 34 and a spring 35 are interposed between the leaf value 31 and the backup member 28. The main value 34 and the spring 35 urge the leaf valve 31 toward the main piston 18. A valve 24 selectively connecting a reserver room provided between the internal cylinder 15 and the cylinder 11 is provided on the bottom of the internal cylinder 15.

In a state where the main piston 18 is in a stationary state, the leaf valves 30 and 31 close a expansion-side path 18a and a contraction-side path 18b provided in the main piston 18 on a single side of both the expansion-side path 18a and the contraction-side path 18b. The paths 18a and 18b are opened on respective single sides thereof in accordance with a movement of the main piston 18 indicated by the arrow A or B. Thus, liquid filled in the first and second liquid rooms 21 and 23 passes through one of the paths 18a and 18b so that it moves between the first liquid room 21 and the second liquid room 23. In a state where the movement of liquid between the first liquid room 21 and the second liquid room 23 is limited to the movement between the paths 18a and 18b, a damping force generated with respect to the movement of the rod 13 is great so that the characteristic of the suspension is "HARD".

Figure 3B:
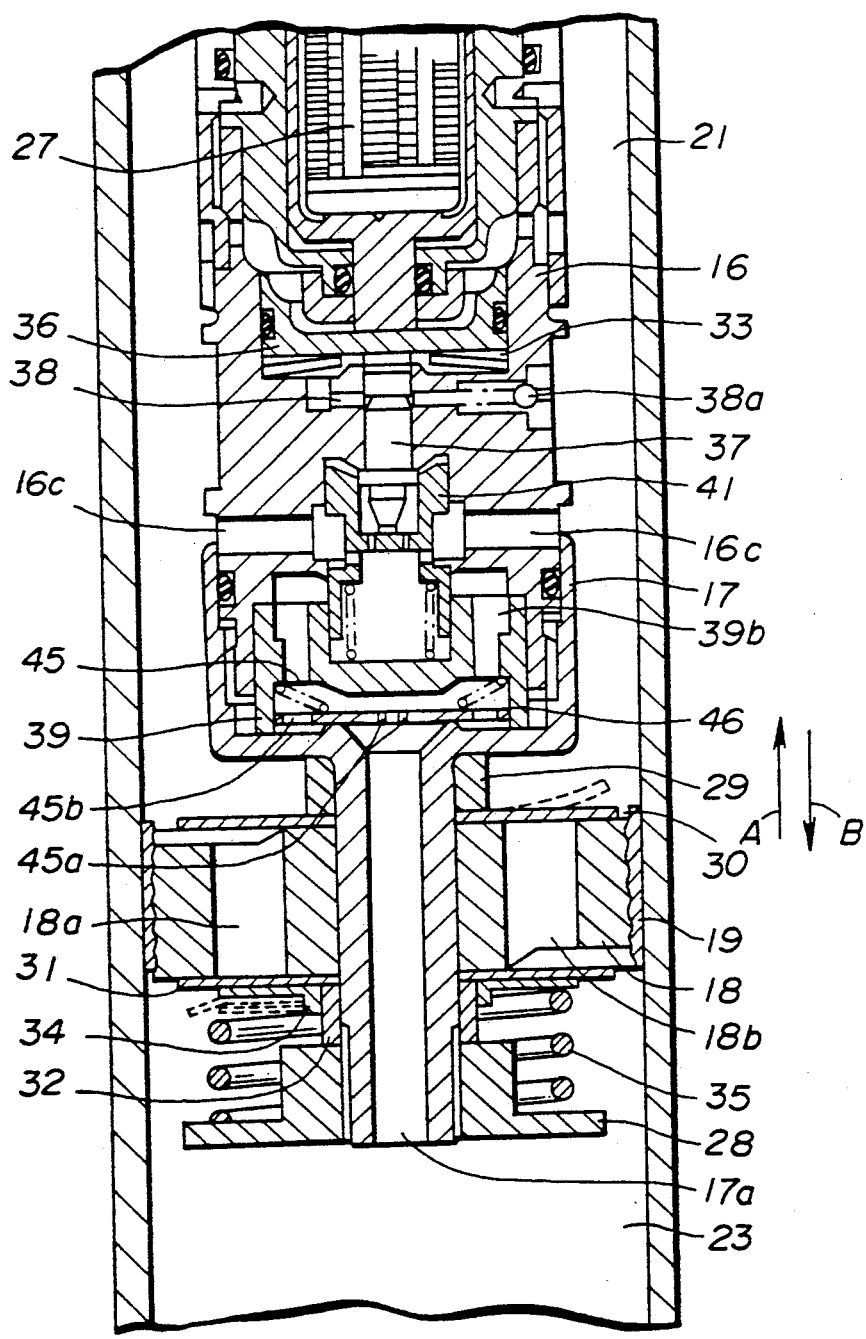
FIG. 3B is an enlarged sectional view of an essential part of the shock absorber shown in FIG. 3A.

As shown in FIG. 3A and 3B, both the piezoelectric load sensor 25 and the piezoelectric actuator 27 provided inside the connecting member 16 are electrostriction element laminated members in which thin plates formed of piezoelectric ceramics are laminated through electrodes. In other words, one electrode is elevationally sandwiched between two adjacent thin plates. Each of the piezoelectric thin plates in the piezoelectric load sensor 25 is polarized due to force generated in the shock absorber 2, that is, damping force. An electrical output signal from each of the piezoelectric thin films in the piezoelectric load sensor 25 is supplied to a impedance circuit, which generates a voltage signal. Thus, it is possible to obtain a rate of change in the damping force from the voltage signal related to each of the piezoelectric thin films.

The piezoelectric actuator 27 has laminated electrostriction elements, each of which expands or contracts with a high responsibility when a high voltage is applied thereto. The piezoelectric actuator 27 directly drives the piston 36. When the piston is moved in the direction indicated by the arrow B shown in FIG. 3B, a plunger 37 and a spool 41 having a substantially H-shaped cross section are moved in the same direction through the movement of oil in an oiltight room 33. When the spool 41 is moved from the position shown in FIG. 3B (original position) in the direction of the arrow B, a sub liquid path 16c connected to the first liquid room 21 and a sub liquid path 39b of a bush 39 connected to the second liquid room 23 become connected to each other. The sub liquid path 39b further becomes connected to a liquid path 17a in the cylindrical member 17 through an oil hole 45a formed in a plate valve 45. Thus, the movement of the spool 41 in the direction of the arrow B causes an increase in the amount of liquid which is transferred between the first liquid room 21 and the second liquid room 23. That is, when the piezoelectric actuator 27 expands with the high-voltage applied thereto, the shock absorber 2 is altered from "HARD" to "SOFT". When the piezoelectric actuator 27 is discharged so that no charge is stored therein, the piezoelectric actuator 27 is returned to "HARD".

The degree of movement of the leaf valve 31 provided on the lower surface of the main piston 18 is controlled by the spring 35. An oil hole 45b having a diameter greater than that of the oil hole 45a is formed in the plate valve 45 at a position farther from the center of the plate value 45 than the oil hole 45a. When the plate valve 45 moves toward the bush 39 against the force by the spring 46, the oil is allowed to move through the oil hole 45b. Thus, the amount of oil obtained when the main piston 18 moves in the direction of the arrow B is greater than that obtained when the main piston 18 moves in the direction of the arrow A, irrespective of the position of the spool 41. That is, the damping force is altered due to the movement direction of the main piston 18 so that improved characteristics of the shock absorber can be obtained. An oil refilling path 38 is provided together with a check valve 38a between the oiltight room 33 and the first liquid room 21 so that the amount of oil in the oiltight room 33 is fixed. The shock absorber 2 shown in FIGS. 3A and 3B is disclosed in "AUTOMOBILE ENGINEERING MANUAL, FIFTH EDITION", *JIDOSHA GIJUTSUKAI*, 1983, pp. 4–27 or "TOYOTA CARINA FF NEW MODEL MANUAL-", *TOYOTA JIDOSHA KABUSHIKI KAISHA*, 1985, pp. 4–87.

Figure 4A:
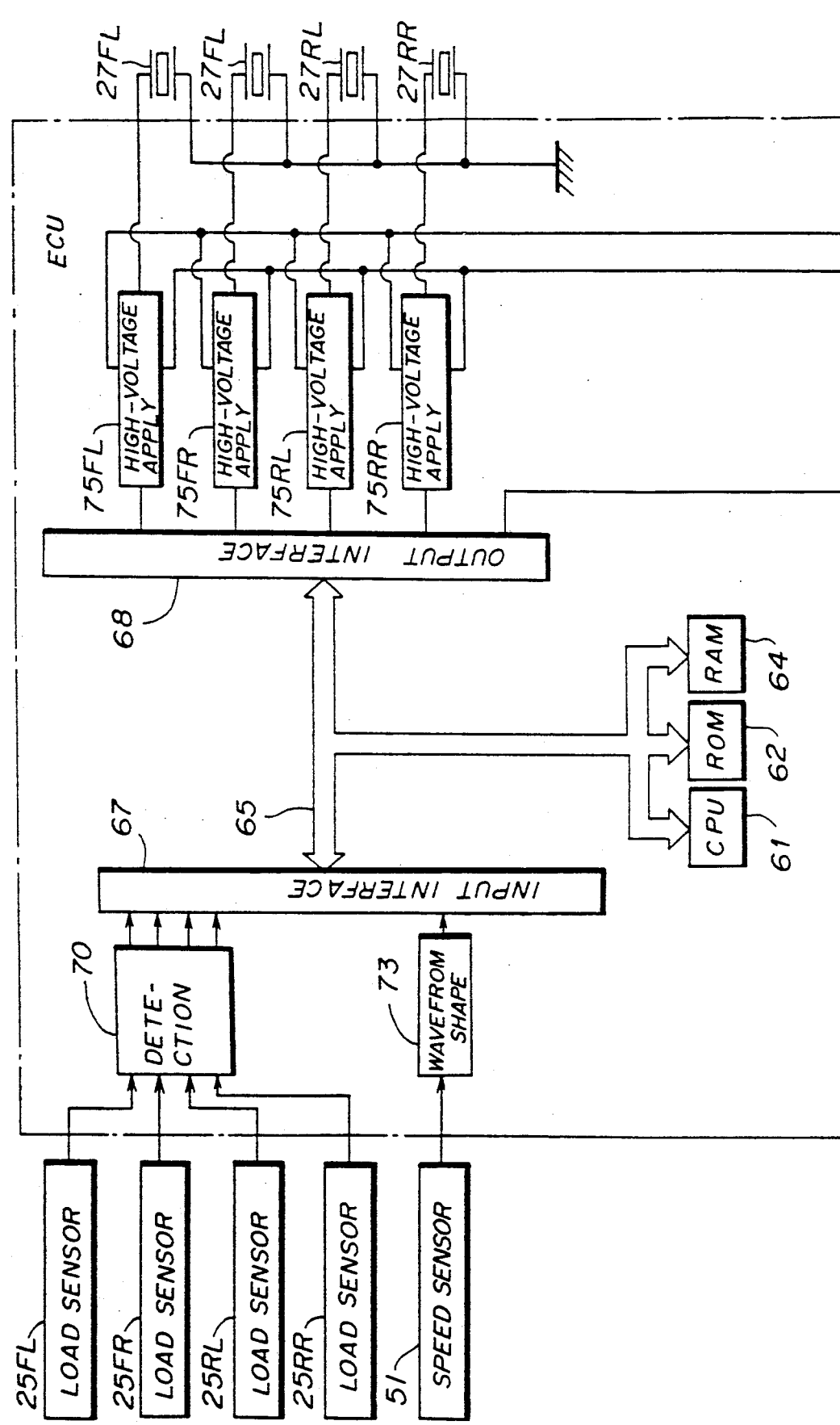

A description will now be given of an electronic control unit (hereafter simply referred to as ECU) 4 for switching the damping force of each of the shock absorbers 2 between the first level (SOFT) and the second level (HARD) with reference to FIGS. 4A and 4B. In order to detect the driving condition of the vehicle, a vehicle speed sensor 51 outputting a series of pulses having a number proportional to the current vehicle speed is provided in addition to the aforementioned piezoelectric sensors 25FL, 25FR, 25RL and 25RR. The output signals from these sensors are input to the ECU 4. The ECU 4 generates output signals individually supplied to high-voltage application circuits 75FL, 75FR, 75RL and 75RR, which drive the piezoelectric actuators 27FL, 27FR, 27RL and 27RR, respectively.

The ECU 4 includes a central processing unit (hereafter simply referred to as a CPU) 61, a read only memory (ROM) 62 and a random access memory (RAM) 64, all of which are connected to a common bus 65. An input interface circuit 67 and an output interface circuit 68 are connected to the common bus 65.

The ECU 4 further includes a damping force detection circuit 70, a waveform-shaping circuit 73, high-voltage application circuits 75FL, 75FR, 75RL and 75RR, an ignition switch 76, a battery 77, a high-voltage power supply circuit 79 and a constant-voltage power supply circuit 80.

The damping force detection circuit 70 has four detection circuits (not shown) individually provided for the piezoelectric load sensors 25FL, 25FR, 25RL and 25RR. Each of the detection circuits receives the detection signal supplied from the corresponding piezoelectric load sensor, and generates a damping force detection signal. As has been described previously, the detection signal from each of the piezoelectric sensors 25FL, 25FR, 25RL and 25RR varies depending on a charge amount which is charged into or discharged from each of the piezoelectric thin films. The input interface circuit 67 includes an analog-to-digital converter (not shown), which converts the damping force detection signal in analog form into a digital signal. The waveform shaping circuit 73 shapes a waveform of the detection signal from the vehicle speed sensor 51 into a waveform appropriate to signal processing executed by the CPU 61, such as a pulse waveform.

The high-voltage application circuits 75FL, 75FR, 75RL and 75RR are connected to the piezoelectric actuators 27FL, 27FR, 27RL and 27RR (FIG. 4B), respectively. The high-voltage power supply circuit 79 is of a switching regulator type, and generates high voltages +500 volts and −100 volts. Each of the high-voltage application circuits 75FL, 75FR, 75RL and 75RR applies a voltage of +500 volts or −100 volts to the corresponding piezoelectric actuator 27 in accordance with a control signal from the CPU 61. When a voltage of +500 volts is applied to the corresponding piezoelectric actuator, it expands. On the other hand, when a voltage of −100 volts is applied to the corresponding piezoelectric actuator, it contracts. Thereby, the oil amount is switched so that the shock absorber 2 is altered to SOFT or HARD. That is, when the piezoelectric actuator 27 is expanded by the application of a voltage of +500 volts, an increased amount of liquid passes between the first liquid room 21 and the second liquid room 23 in the shock absorber 2 so that the damping force is decreased. On the other hand, when the piezoelectric actuator 27 is contacted by the application of a voltage of −100 volts, a decreased amount of liquid passes between the first liquid room 21 and the second liquid room 23 so that the damping force is increased. The constant voltage power supply circuit 80 converts the voltage of the battery 77 into an operating voltage (5 volts for example).

A description will now be given of the operation of the suspension control system according to the first embodiment of the present invention with reference to FIGS. 5 and 6. When the ignition switch 76 (FIG. 4B) is turned ON (step 200), the CPU 61 starts to execute the control process shown in FIG. 5. First, the CPU initializes the elements of the system in a conventional way (step 210). At step 220, the CPU 61 inputs a series of waveform-shaped pulses from the waveform shaping circuit 73. At step 230, the CPU 61 obtains a current vehicle speed Vs from the frequency of the waveform-shaped pulses. At step 240, the CPU 61 inputs the damping force detection signals from the piezoelectric load sensors 25 in digital form through the damping force detection circuit 70. Each of the damping force detection signals indicates the level of the damping force of the corresponding shock absorber. Then the CPU 61 compares the level of each damping force with a reference damping force level. Then the CPU 61 determines the level of damping force of each of the shock absorbers 2 on the basis of the comparison results. Thereby, each shock absorber 2 is maintained in or switched to SOFT or HARD. The aforementioned reference damping level is stored in the ROM 62 (FIG. 4B).

At step 250, the CPU 61 compares the vehicle speed Vs detected by the vehicle speed sensor 51 with a reference vehicle speed Vso, which is stored in the ROM 62. The reference vehicle speed Vso is equal to 80 km/h, for example. When the vehicle speed Vs is greater than or equal to the reference vehicle speed Vso, the control process proceeds to step 250a. When the determination result obtained at step 250 is YES, the CPU 61 determines that the vehicle speed Vs is high enough to absorb a rolling of the vehicle. At step 250a, the CPU 61 individually supplies the high-voltage application circuits 75 with instruction signals which correspond to the levels of the damping forces of the shock absorbers 2 determined at step 240. Thereby, each of the high-voltage application circuits 75 individually supplies the corresponding piezoelectric actuator 27 with the voltage determined by the level of the damping force of the corresponding instruction signal from the CPU 61. That is, when $Vs \geq Vso$, the piezoelectric actuators 27 are driven separately in accordance with the corresponding instruction signals. Thus, each of the suspensions 2 is separately controlled. Even when the suspensions 2 are separately controlled, the rolling of the vehicle hardly take place.

On the other hand, when the determination result at step 250 is NO, the control process proceeds to step 250b. At step 250b, the CPU 61 executes an OR logic operation between the two setting levels of the damping forces of the shock absorbers 2FL and 2FR provided for the front wheels 5FL and 5FR (FIG. 2) which are determined at step 240. The OR logic operation executed at step 250b is such that the level of damping force indicative of SOFT has priority to that indicative of HARD. That is, when one of the two setting levels of the damping forces of the shock absorbers 2FR and 2FL indicates SOFT, the instruction signals addressed to the high-voltage application circuits 75FL and 75FR both represent SOFT. At step 250c, the CPU 61 executes an OR logic operation between the setting level of the damping forces of the shock absorbers 2RL and 2RR provided for the rear wheels 5RL and 5RR. The OR logic operation executed at step 250c is the same as that at step 250b. That is, when one of the two setting levels of the damping forces of the shock absorbers 2RL and 2RR indicates SOFT, the instruction signals addressed to the high-voltage application circuits 75RL and 75RR both represent SOFT. In the above-mentioned way, the CPU 61 sends the same instruction signals to the high-voltage application circuits 75FL and 75FR, and sends the same instruction signals to the high-voltage application circuits 75RL and 75RR.

The high-voltage application circuits 75FL and 75FR apply the same voltage to the piezoelectric actuators 27FL and 27FR, respectively. The high-voltage application circuits 75RL and 75RR apply the same voltage to the piezoelectric actuators 27RL and 27RR. As a result, the shock absorbers 2FL and 2FR for the front wheels 5FL and 5FR provide the same damping force (SOFT or HARD) and the shock absorbers 2RL and 2RR for the rear wheels 5RL and 5RR provide the same damping force. As a result of this control, the occurrence of rolling is suppressed when $Vs < Vso$. Thus a person in the vehicle body will feel a much more comfortable ride. In addition, since the smaller damping force is selected for each of the pairs of right and left wheels, ride comfort at low speeds will be further improved.

A description will now be given of a variation of the aforementioned first embodiment of the present invention with reference to FIG. 6. In the variation shown in FIG. 6, steps 260 and 270 are added to the control process shown in FIG. 5, and step 250A is substituted for step 250 in FIG. 5. The control process shown in FIG. 6 is stored in the ROM 62 in place of the control process shown in FIG. 5. Alternatively, it is possible to provide the ROM 62 with the control processes shown in FIGS. 5 and 6 and select one of these control processes.

When it is determined, at step 250A, that $Vs \geq Vso$, the control process proceeds to step 250a, at which step the shock absorbers 2FL, 2FR, 2RL and 2RR are separately controlled. When it is determined, at step 250A, that the vehicle speed Vs is less than a reference vehicle speed Vsl (=40 km/h) stored in the ROM 62, the CPU 61 executes the procedure of steps 250b, 250c and 250d. In this procedure, the damping force of each of the front wheels 5FL and 5FR is set to the same level, and the damping force of each of the rear wheels 5RL and 5RR is set to the same level. Thus, the occurrence of rolling of the vehicle can be prevented.

When it is determined, at step 250A, that $Vso > Vs \geq Vsl$, the control process proceeds to step 260, at which step, the aforementioned OR logic operation is carried out for the setting levels of the damping forces of the shock absorbers 2RL and 2RR. That is, when one of the setting levels of the damping forces of the shock absorbers 2RL and 2RR indicates SOFT, the damping force of each of the shock absorbers 2RL and 2RR is set to SOFT. It should be noted that the OR logic operation is not carried out for the setting levels of the damping forces of the shock absorbers 2FR and 2FL provided for the front wheels 5FR and 5FL. That is, the setting levels of the damping forces of the shock absorbers 2FR and 2FL determined at step 240 are used. For example, when the setting level of the shock absorber 2FL indicates SOFT and the setting level of the shock absorber 2FR indicates HARD, the shock absorbers 2FL and 2FR are controlled to SOFT and HARD, respectively. Thus, it becomes possible to effectively suppress the rolling which is frequently liable to occur on the rear-wheel side when $Vso > Vs \geq Vsl$, while the shock absorbers 2FL and 2FR are separately controlled.

The reference vehicle speeds Vso and Vsl are not limited to the aforementioned values and can be set to appropriate values. The aforementioned shock absorbers 2 are of the variable damping force type. Alternatively, it is possible to employ a different type of shock absorber such as a variable spring constant type shock absorber.

A description will now be given of a suspension control system according to a second preferred embodiment of the present invention. FIG. 7 is a block diagram illustrating the principle of the second embodiment of the present invention. The suspension control system according to the second embodiment of the present invention is comprised of the following elements. A vibration detecting means M11 detects a vibration of the vehicle body. A suspension means M13 is provided for each wheel M12 and changes the characteristic thereof in accordance with the level of the vibration detected by the vibration detecting means M11 so that the vibration is suppressed. The characteristic of the suspension means M13 is changed by altering the level of the damping force or spring constant thereof, for example. A driving condition detecting means M14 detects an accelerating state of the vehicle and/or a braking state thereof. A right/left wheel synchronization control means M15 switches the vibration suppressing control from a first mode to a second mode when the driving condition detecting means M14 detects the accelerating state or braking state. In the first mode, the suspension means M13 provided for the wheels M12 are separately controlled. In the second mode, the suspension means M13 related to the front wheels M12L and M12R are controlled so that they provide the same damping force, and the suspension means M13 related to the rear wheels M12L and M12R are controlled so that they provide the same damping force. Thus, the ground contact load of each front wheel 5F is almost the same as each other, and the ground contact load of each rear wheel 5R is almost the same as each other.

FIGS. 8A and 8B illustrate a detailed structure of the suspension control system according to the second preferred embodiment of the present invention. In FIGS. 8A and 8B, those parts which are the same as those shown in FIGS. 4A and 4B are given the same reference numerals. A damping force change rate detection circuit 170 includes four detection circuits in a similar way to the aforementioned damping force detection circuit 70 (FIG. 4A). Each of the detection circuits receives the voltage signal (detection signal) from the corresponding piezoelectric load sensor 25 and outputs a signal representative of a rate of change in the damping force of the corresponding shock absorber 2. In order to detect the driving condition of the vehicle, a throttle sensor 50, a brake oil pressure sensor 52 and a stop lamp switch 53 are provided in addition to the aforementioned piezoelectric load sensors 25 and the vehicle speed sensor 51. The throttle sensor 50 detects an open angle of a throttle value (not shown) and outputs a detection signal indicative of the detected open angle. The brake oil pressure sensor 52 detects an oil pressure of a brake oil in a braking unit (not shown). The brake oil pressure increases in accordance with the degree of stepping on the brake pedal. The stop lamp switch 53 generates a low-level signal when the brake pedal is stepped on. A waveform shaping circuit 173 receives the detection signals from the sensors 50, 51 and 52, and subjects these signals to a waveform shaping process so that signals suitable for signal processing in the CPU 61, such as pulse signals, are obtained. The detection signal from the stop lamp switch 53 is input to the input interface circuit 67.

Figure 9:
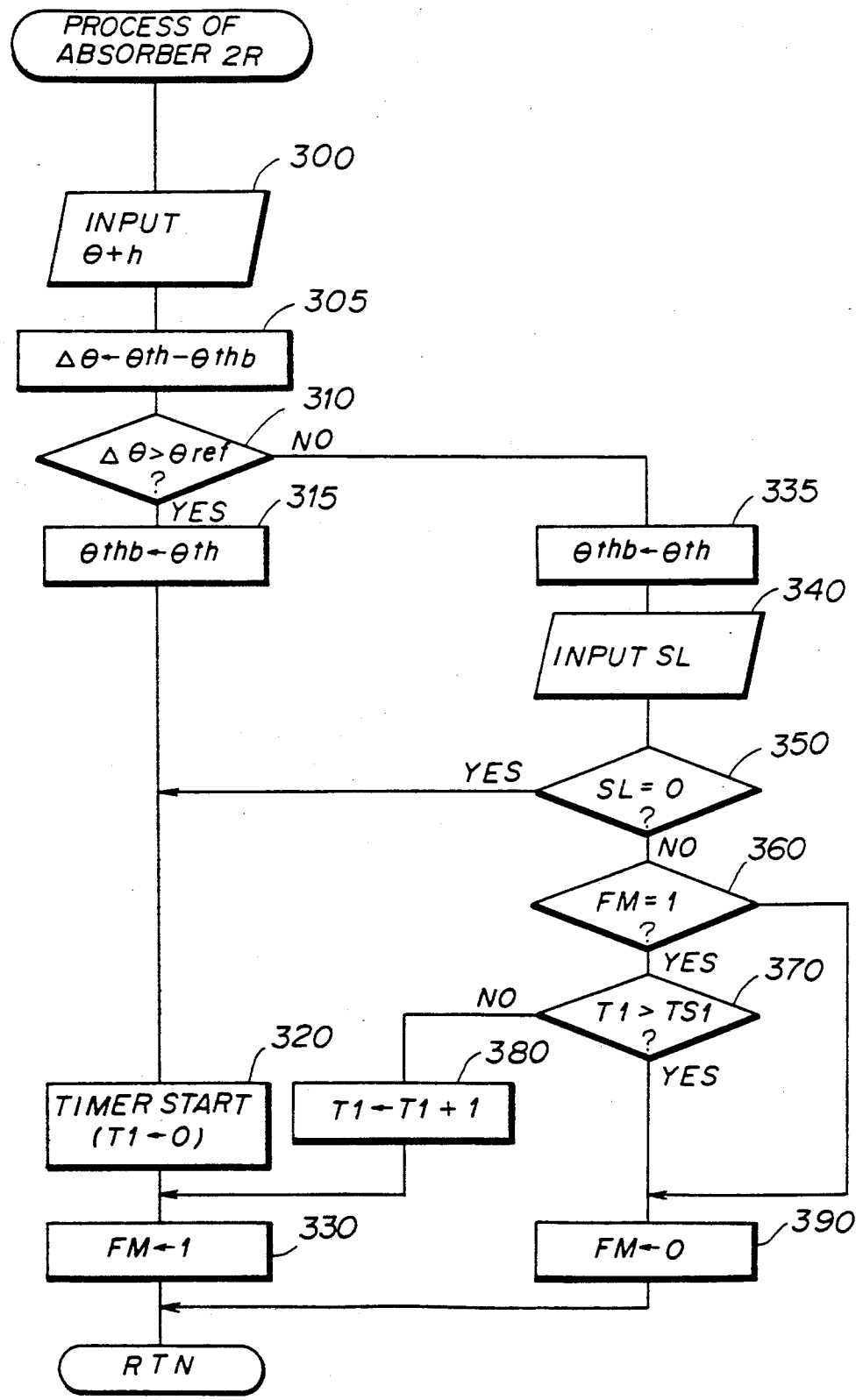
FIG. 9 is a flowchart of a damping force control process which is executed when the vehicle is rapidly being accelerated or braked in the system shown in FIGS. 8A and 8B.
Figure 10:
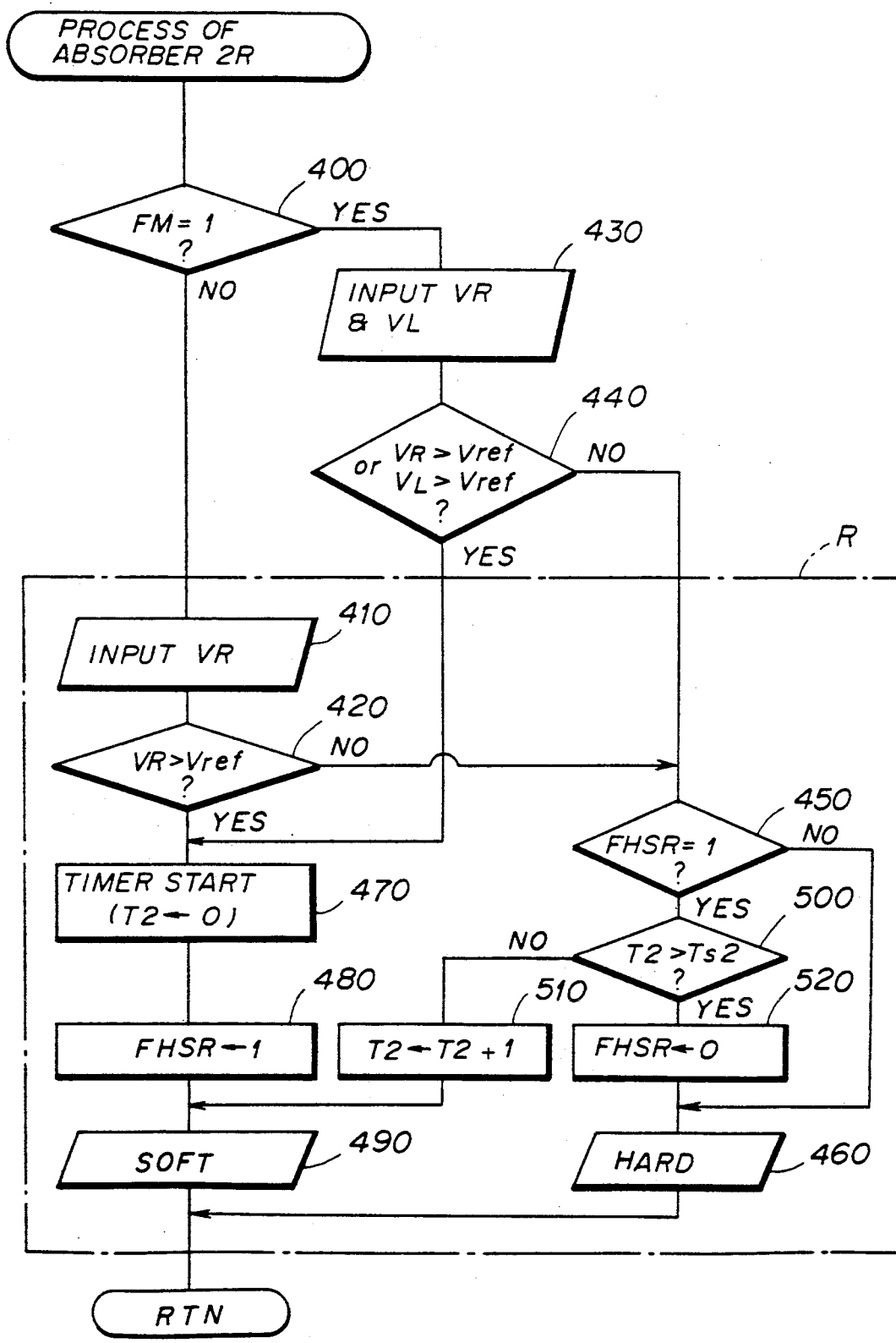
FIG. 10 is a flowchart of a damping force control process of controlling the shock absorbers provided for the right wheels in the system shown in FIGS. 8A and 8B.
Figure 11:
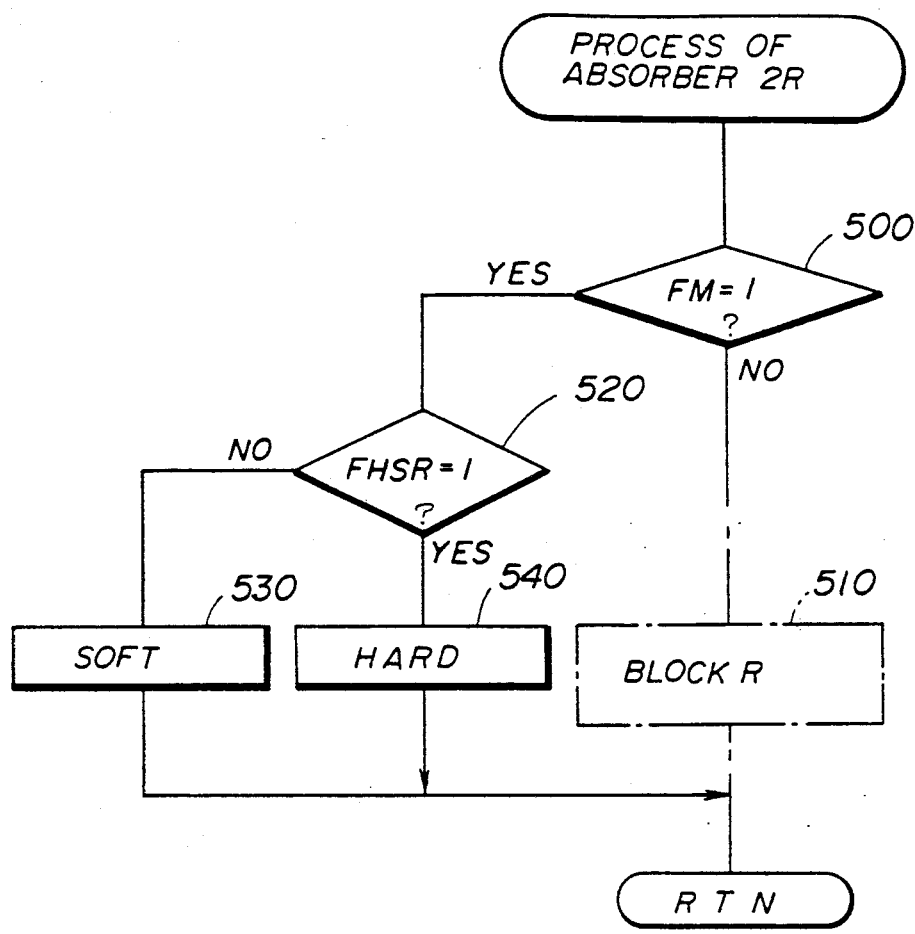
FIG. 11 is a flowchart of a damping force control process of controlling the shock absorbers provided for the left wheels in the system shown in FIGS. 8A and 8B.

A description will now be given of the operation of the suspension control system shown in FIGS. 8A and 8B with reference to FIGS. 9, 10 and 11. The control processes shown in FIGS. 9–11 are stored in the ROM 62 and are repeatedly carried out at predetermined intervals. The control process shown in FIG. 9 is a damping force control routine in which various variables (parameters) are controlled depending on the driving condition of the vehicle. The control processes shown in FIGS. 10 and 11 are damping force alteration control processes in which the shock absorbers are maintained or switched by referring to the variables (parameters) determined in the control process shown in FIG. 9.

The control process has two modes as in the case of the aforementioned first embodiment of the present invention. In the first mode, the four shock absorbers 2 are separately controlled. In the second mode, the shock absorbers 2FL and 2FR provided for the front wheels 5FL and 5FR are controlled so that they provide the same damping force, and the shock absorbers 2RL and 2LR provided for the rear wheels 5RL and 5RR are controlled so that they provide the same damping force. When a rapid accelerating state or braking state is detected by the damping force control process shown in FIG. 9 and a mode flag FM (which will be described later) is set to 1, the control process is changed from the first mode to the second mode.

Referring to FIG. 9, at step 300, the CPU 61 inputs the detection signal representative of an output value (open angle) θth from the throttle sensor 50. At step 305, the CPU 61 calculates a difference Δθ between the output value θth just obtained at step 300 and an immediately previous value θthb. The difference Δθ obtained at step 305 indicates the difference between the current open angle of the throttle value and the immediately previous open angle thereof. At step 310, the CPU 61 determines whether the difference Δθ is greater than a reference angle θref. When the determination result at step 310 is YES, the CPU 61 determines that the vehicle is rapidly being accelerated. Thus the CPU 61 executes step 315, at which step the current output value θth is set to the immediately previous output value θthb. At step 320, the CPU 61 starts a timer (software timer). At this step, a value of 0 is written into a timer variable T1 so that the timer is reset. At step 330, a value of 1 is written into the mode flag FM. When the mode flag FM has a value of 1, the aforementioned control procedures shown in FIGS. 10 and 11 are executed so that the shock absorbers 2FL and 2FR are controlled so as to provide the same damping force and the shock absorbers 2RL and 2RR are controlled so as to provide the same damping force.

On the other hand, when the determination result obtained at step 310 is NO, the control process proceeds to step 335. In this case, the CPU 61 determines that the vehicle is not in the rapidly accelerating state. At step 335, the current output value θth is set to the immediately previous output value θthb. At step 340, the CPU 61 inputs the detection signal SL from the stop lamp switch 53 (FIG. 8A). At step 350, the CPU 61 determines whether or not SL=0, that is, whether or not the vehicle is in the braking state. When the detection signal SL is equal to 0 and thus the vehicle is in the braking state, the timer T1 is reset to 0 so that it is started at step 320. Then the mode flag FM is set to 1 at step 330. Thereby, the damping force control in accordance with the control procedure shown in FIGS. 10 and 11 is executed.

When the determination result obtained at step 310 is still affirmative even after the damping force control is switched to the second mode or when the detection signal SL from the stop lamp switch 53 is equal to 0, steps 320 and 330 are carried out. After that, when the determination result obtained at step 310 is NO or when it is determined at step 350 that the detection signal SL from the stop lamp switch 53 is not equal to 0 but 1, the CPU 61 determines, at step 360, whether or not the mode flag FM is equal to 1. When the determination result obtained at step 360 is NO, the CPU 61 executes step 390, at which step a value of 0 is written into the mode flag FM. On the other hand, when the determination result obtained at step 360 is YES, the CPU 61 determines, at step 370, whether or not the value of the timer variable T1 is greater than a reference value TS1. The reference value TS1 is provided for maintaining a value of 1 in the mode flag FM for a predetermined time after the rapidly accelerating state or braking state is released. When the value of the timer variable T1 is less than or equal to the reference value TS1, the control process proceeds to step 380, at which step the timer variable T1 is incremented by +1. Then the mode flag FM is set to 1 at step 330. In this case, the shock absorbers 2FL and 2FR are controlled so that they continue to provide the same damping force and the shock absorbers 2RL and 2RR are controlled so that they continue to provide the same damping force.

The determination result at step 370 becomes YES, when the difference Δθ does not exceed the reference value θref or the detection signal SL does not become equal to 0 until the predetermined time (corresponding to TS1) elapses from the time when the difference Δθ has become less than or equal to the reference value θref (step 310) or the detection signal has become equal to the reference value θref (step 350). Then the mode flag FM is reset to 0 at step 390 and the four shock absorbers 2 are separately controlled according to the control routine shown in FIGS. 10 and 11.

According to the damping force control process which is executed in the rapidly accelerating state or braking state, the mode flag FM is set to 1 when the difference Δθ is greater than the reference value θref or SL=0. The mode flag FM is maintained as it is until at least the time corresponding to the reference time TS1 elapses from the time when the rapidly accelerating state or braking state is released whereby the shock absorbers 2FR and 2FL are controlled so that they provide the same damping force and the shock absorbers 2RL and 2RR are controlled so that they provide the same damping force. When the time corresponding to the reference time TS1 elapses in the state where the rapidly accelerating state or braking state is released, the mode flag FM is set to 0 so that the damping force control separately controls the four shock absorbers 2.

A description will now be given of the damping force alteration control process shown in FIGS. 10 and 11. This control process alters the damping force of each shock absorber 2 by referring to the value in the mode flag FM which is set or reset depending on the driving condition.

The control process shown in FIG. 10 is executed separately for shock absorbers 2FR and 2RR provided for the front right wheel 5FR and the rear right wheel 5RR, respectively. Similarly, the control process shown in FIG. 10 is carried out separately for the shock absorbers 2FL and 2RL provided for the left front wheel 5FL and the left rear wheel 5RL, respectively. It will be noted that the following description related to FIGS. 10 and 11 is given without especially distinguishing the front wheels from the rear wheels.

A description will now be given of the control process which is carried out separately for the shock absorbers 2FR and 2RR (hereafter each of the shock absorbers 2FR and 2RR or both are simply referred to as shock absorber 2R or shock absorbers 2R) provided for the right front and rear wheels 5FR and 5RR (hereafter each of the wheels or both 5FR and 5RR are simply referred to as rear wheel 5R or rear wheels 5R). It will be noted that each of the shock absorbers 2FL and 2RL is controlled by the control process shown in FIG. 10.

Referring to FIG. 10, at step 400, the CPU 61 commences to determine whether or not the mode flag FM has a value of 1. When the mode flag FM is equal to 0, at step 410, the CPU 61 inputs the rate of change VR in the damping force of the shock absorber 2R (2FR or 2RR) for the right wheel 5R from the damping force change rate detection circuit 170 (FIG. 8A). At step 420, the CPU 61 determines whether or not the damping force change rate VR is greater than a reference value Vref.

On the other hand, when it is determined, at step 400, the mode flag FM has a value of 1, the CPU 61 determines that the driving condition is in the rapidly accelerating state or braking state. At step 430, the CPU 61 inputs, from the damping force change rate detection circuit 170, the rate of change VR in damping force of the shock absorber 2R being considered as well as the rate of change VL in damping force of the shock absorber 2L at a position opposite to that of the shock absorber 2R being considered. For example, the rate of change VR in the damping force of the shock absorber 2FR is input, and the damping force change rate VL in the damping force of the shock absorber 2FL is input. At step 440, the CPU 61 determines whether or not the damping force change rate VR is greater than the reference value Vref or whether or not the damping force change rate VL is greater than the reference value Vref.

The control process proceeds to step 450, when it is determined, at step 420, that the damping force change rate VR is not greater than the reference value Vref value in the normal driving condition or when it is determined, at step 440, that the damping force change rates VR and VL are both equal to or less than the reference value Vref in the rapidly accelerating state or braking state. At step 450, the CPU 61 determines whether or not a flag FHSR indicating that the suspension being considered is in SOFT is equal to 1. When the flag FHSR is not equal to 1, that is, the suspension being considered is not in SOFT, the suspension provided for the right wheel 5R is controlled so that it is in HARD at step 460. Then the control routine shown in FIG. 10 is terminated. At step 460, immediately after the shock absorber is switched from SOFT to HARD, a voltage of −100 volts is applied to the corresponding piezoelectric actuator 27 in accordance with the instruction signal from the CPU 61 through the output interface circuit 68 so that the piezoelectric actuator 27 is contracted. When the piezoelectric actuator 27 is already in the contracted state, it is maintained as it is.

On the other hand, the control process proceeds to step 470, when it is determined, at step 420, that the damping force change rate VR is greater than the reference value Vref in the normal driving condition, or it is determined, at step 440, that one of the damping force change rates VR and VL is greater than the reference value Vref in the rapidly accelerating state or braking state. At step 470, a timer variable T2 is reset to 0 so that the timer defined by the timer variable T2 is started. Then the flag FHSR is set to 1 at step 480. Then the procedure at step 490 is executed. At step 490, a voltage of +500 volts is applied to the corresponding piezoelectric actuator 27 so that the corresponding shock absorber 2 is set to SOFT. Then the control process shown in FIG. 10 ends.

After the shock absorber 2R is switched to SOFT, the control process in which the timer T2 is started and the damping force is switched to SOFT is repeatedly carried out when the damping force change rate VR exceeds the reference value Vref in the normal driving condition (step 420) or when one of the damping force change rates VR and VL exceeds the reference value Vref in the rapidly accelerating state or braking state (step 440). On the other hand, the step 450 is executed when the rate of change VR in the damping force of the shock absorber 2R is less than or equal to the reference value Vref (step 420) or when the damping force change rates VR and VL are both less than or equal to the reference value Vref. At step 450, the CPU 61 determines whether or not FHSR=1. At step 500, the CPU 61 determines whether or not T2 is greater than the reference value TS2. The reference value TS2 is provided for maintaining the shock absorber 2R in SOFT state during the predetermined time after it is switched thereto. When the value of the timer variable T2 is less than or equal to the reference value TS2, the timer variable T2 is incremented by +1 at step 510. The damping force of the shock absorber 2R is maintained in SOFT state (step 490).

The determination result obtained at step 500 is YES, when the rate of change in the damping force of the shock absorber 2R does not exceed the reference value Vref or none of the rates of change in the damping force VR and VL exceed the reference value Vref until the predetermined time (corresponding to TS2) elapses from the time when the damping force change rate VR becomes less than or equal to the reference value Vref in the normal driving condition or the damping force change rates VR and VL both become less than or equal to the reference value Vref. Then the flag FHSR is reset to 0 at step 520, and the damping force of the shock absorber 2R is set to HARD.

In the normal driving condition (FM=0), the damping force of the shock absorber 2R is controlled on the basis of the damping force change rate VR related to the right wheel 5R shown by a block depicted by the one-dotted chain line R. That is, when the damping force change rate VR related to the right wheel 5R exceeds the reference value Vref, the damping force of the shock absorber 2R is switched to the low level (SOFT). This state (SOFT) is maintained during the predetermined time corresponding to TS2 from the time when the damping force change rate VR becomes less than or equal to the reference value Vref. The damping force of the shock absorber 2R is set to the high level (HARD) when the predetermined time elapses while the shock absorber 2R is maintained in SOFT.

On the other hand, in the rapidly accelerating state or braking state (FM=1), the damping force of the shock absorber 2R is controlled on the basis of the damping force change rates VR and VL. That is, when one of the damping force change rates VR and VL exceeds the reference value Vref, the damping force of the shock absorber 2R is immediately switched to the small level (SOFT). This state (SOFT) is maintained during the time corresponding to TS2 from the time when the damping force change rates VR and VL both become less than or equal to the reference value Vref. The damping force of the shock absorber 2R is switched to the high level (HARD) when the predetermined time elapses from the time when the damping force change rates VR and VL become less than or equal to the reference value Vref.

A description will now be given of the damping force control process (FIG. 11) which is carried out separately for the shock absorbers 2FL and 2RL related to the left front and rear wheels 5FL and 5RL. It will be noted that reference 2L denotes one of the shock absorbers 2FL and 2RL or both and reference 5L denotes one of the wheels 5FL and 5RL or both.

At step 500, the CPU 61 determines whether or not the mode flag FM is equal to 1. When the mode flag FM is equal to 1 so that the vehicle is in the normal driving condition, the CPU 61 executes a damping force switching control process at step 510. It will be noted that the procedure at step 510 is the same as the procedure in the block R indicated by the one-dotted chain line. Thus, the description of the procedure at step 510 is omitted.

The control process proceeds to step 520, when the mode flag FM is equal to 1 so that the vehicle is in the rapidly accelerating state or braking state. At step 520, the CPU 61 determines whether or not the flag FHSR related to the right wheel is equal to 1. When the flag FHSR is equal to 1, at step 530, the damping force of the shock absorber 2L is switched to the low level (SOFT) so that it coincides with that of the shock absorber 2R related to the corresponding right wheel 5R. On the other hand, at step 540, the damping force of the shock absorber 2L is switched to the high level (HARD) so that it coincides with that of the shock absorber related to the corresponding right wheel 5R, when the flag FHSR is not equal to 1.

In the normal driving condition, each of the shock absorbers provided for the wheels 5FL, 5FR, 5RL and 5RR is separately controlled on the basis of the magnitude relationship between the damping force change rate V and the reference value Vref in accordance with the damping force pattern switching control process (FIG. 10) related to each of the shock absorbers 2R provided for the right wheels 5R. Thus, it becomes possible to realize high stability and controllability suspension characteristics.

In the rapidly accelerating state or braking state, each of the shock absorbers 2R is controlled for a pair of shock absorbers 2FL and 2FR and a pair of shock absorbers 2RL and 2RR on the basis of the magnitude relationship between the damping force change rates VR and VL and the reference value Vref. Each of the shock absorbers 2L is switched to SOFT or HARD so that it provides the same damping force as the corresponding shock absorber 2R at almost the same time as the shock absorber 2R is switched to SOFT or HARD. As a result, the damping forces of the front shock absorbers 2FR and 2FL are the same as each other, and the damping forces of the rear shock absorbers 2FR and 2RR are the same as each other during the rapidly accelerating state or braking state as well as during the predetermined time after the time when the rapidly accelerating state or braking state is released. Thus, the front wheels 5R support almost the same load and the rear wheels 5L support almost the same load so that the driveability or braking ability on the left and rear wheel sides is the same as each other and thus high stability can be realized.

Figure 12:
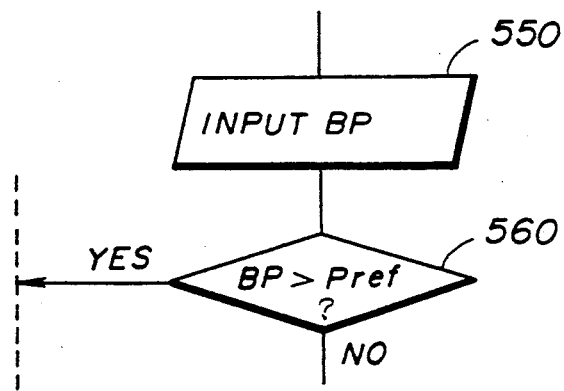
FIG. 12 is a flowchart of an essential part of a control process according to a variation of the second embodiment of the present invention.

A description will now be given of a variation of the aforementioned second embodiment of the present invention with reference to FIG. 12. The third embodiment of the present invention is the same as the second embodiment except that steps 340 and 350 (FIG. 9) are replaced by steps 550 and 560 shown in FIG. 12. In the third embodiment, the detection signal from the brake oil pressure sensor 52 (FIG. 8A) is used in place of that from the stop lamp switch 53. The CPU 61 inputs an output (brake oil pressure) BP from the brake oil pressure sensor 52 at step 550, and determines, at step 560, whether or not the brake oil pressure BP exceeds a reference value Pref. When the brake oil pressure BP is greater than the reference value Pref, the CPU 61 determines that the vehicle is in the braking state. Then the timer T1 is started at step 320 (FIG. 9) and the mode flag FM is set to 1 at step 330.

It is possible to detect the braking state by determining whether or not the damping force change rates related to the four wheels become equal to or greater than a threshold value. Such a state is caused when the vehicle is in the braking state.

A description will now be given of a suspension control system according to a third preferred embodiment of the present invention. Referring to FIG. 13, there is illustrated the principle of the third preferred embodiment of the present invention. The suspension control system according to the third embodiment of the present invention is composed of the following elements. A suspension means M31 is provided for each wheel M30. A vibration detecting means M32 detects a vibration of the vehicle body. A control means M33 controls each suspension means M31 in accordance with the vibration detected by the vibration detecting means M32. A driving condition detecting means M34 detects a driving condition which causes a tilt of the vehicle. A vehicle attitude determination means M35 determines whether or not the degree of tilt of the vehicle which is predicted from the driving condition detected by the driving condition detecting means M34 is greater than or equal to a predetermined value. An inhibiting means M36 inhibits at least one of the signals from being set to SOFT (low level) when a predicted tilt of the vehicle is greater than the predetermined value. The four wheels M30 are classified into groups in accordance with a predetermined criteria. According to a criteria, a first group consists of a pair of front wheels and a second group consists of a pair of rear wheels. According to another criteria, a first group consists of a pair of left wheels and a second group consists of a pair of right wheels. According to a third criteria, all the wheels belong to a single group. When it is determined that a predicted tilt of the vehicle is greater than the predetermined value, the inhibiting means M36 prevents at least one of the suspension means M31 for each of the groups.

Figure 14A:
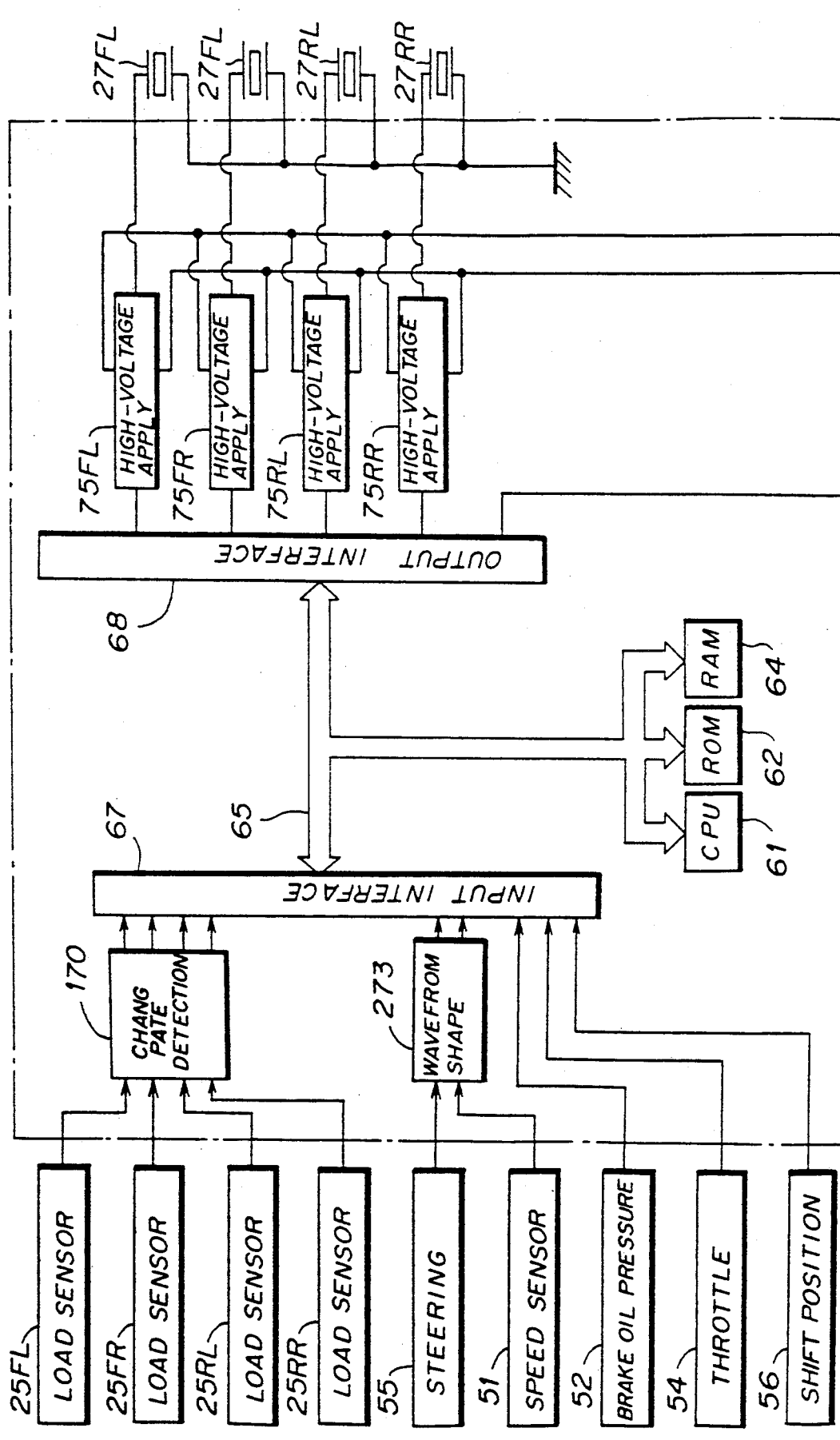

A description will be given of a detailed structure of the system shown in FIG. 13. Referring to FIG. 14, there is illustrated a detailed structure of the suspension control system according to the third embodiment of the present invention. In FIG. 14, those parts which are the same as those shown in FIG. 13 are given the same reference numerals. The system includes a steering sensor 55 and a shift position sensor 56 in addition to the piezoelectric load sensors 25, the vehicle speed sensor 51, the brake oil pressure sensor 52 and the throttle sensor 54. The steering sensor 55 outputs the detection signal representative of a steering angle $\eta$. The shift position sensor 56 outputs the detection signal representative of a shift position of a change gear. The detection signals from the speed sensor 51 and the steering sensor 55 are input to a waveform shaping circuit 273, which subjects these detection signals to a waveform shaping process. It is also possible to supply the waveform shaping circuit 273 with the detection signals from the brake oil pressure sensor 52, the throttle sensor 54 and/or the shift position sensor 56.

Figure 15:
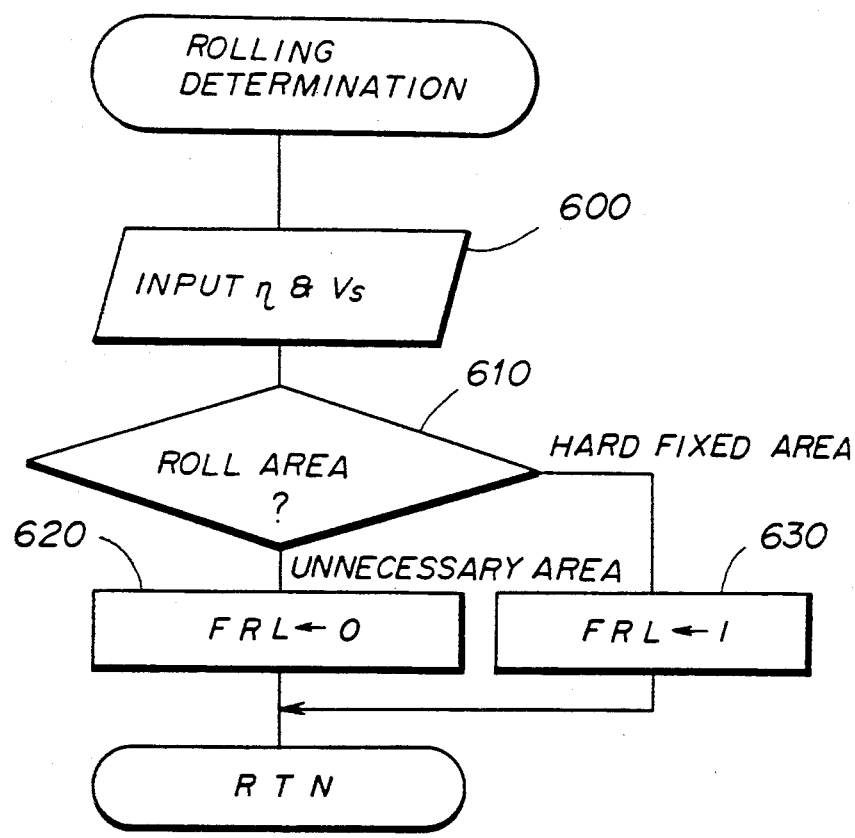
FIG. 15 is a flowchart of a rolling area determination interrupt process executed in the system shown in FIGS. 14A and 14B.
Figure 16:
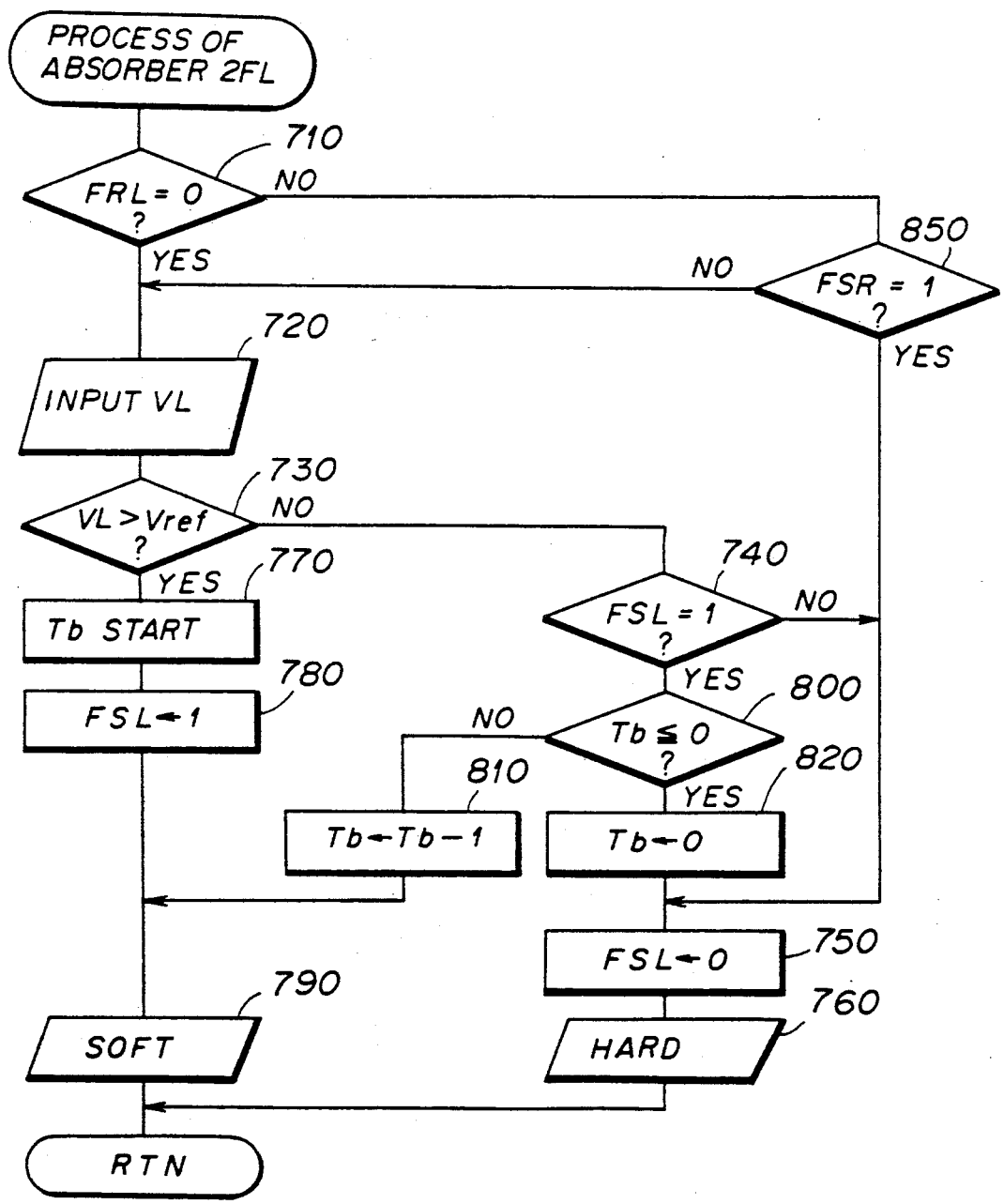
FIG. 16 is a flowchart of a right front wheel damping force control interrupt process executed in the system shown in FIGS. 14A and 14B.

A description will now be given of the operation of the suspension control system with reference to FIGS. 15 and 16. FIG. 15 illustrates a rolling area determination interrupt process, which is repeatedly carried out at predetermined intervals. Based on the driving condition, the process in FIG. 15 determines an area in which a rolling control should be performed on the basis of the degree of a predicted tilt of the vehicle. FIG. 16 illustrates a right front wheel damping force control interrupt process. The process shown in FIG. 16 is repeatedly carried out at predetermined intervals after an initialization is executed in which flags such as FSR and FSL are reset to 0. By the process shown in FIG. 16, the damping force of each shock absorber 2 is switched between the low level (SOFT) and the high level (HARD). As will be described in detail later, the process shown in FIG. 16 refers to the value of the flag FRL which is used in the interrupt process shown in FIG. 15. Each of the processes shown in FIGS. 15 and 16 is carried out separately for a pair of front wheels 2FL and 2FR and a pair of rear wheels 2RL and 2RR. Alternatively, it is possible to classify the four wheels into a first group of a pair of left wheels 2FL and 2RL and a second group of a pair of right wheels 2FR and 2RR or classify the four wheels into a first group of left and right front wheels and a turn outer side wheel and a second group consisting of the remaining rear wheel.

Figure 17:
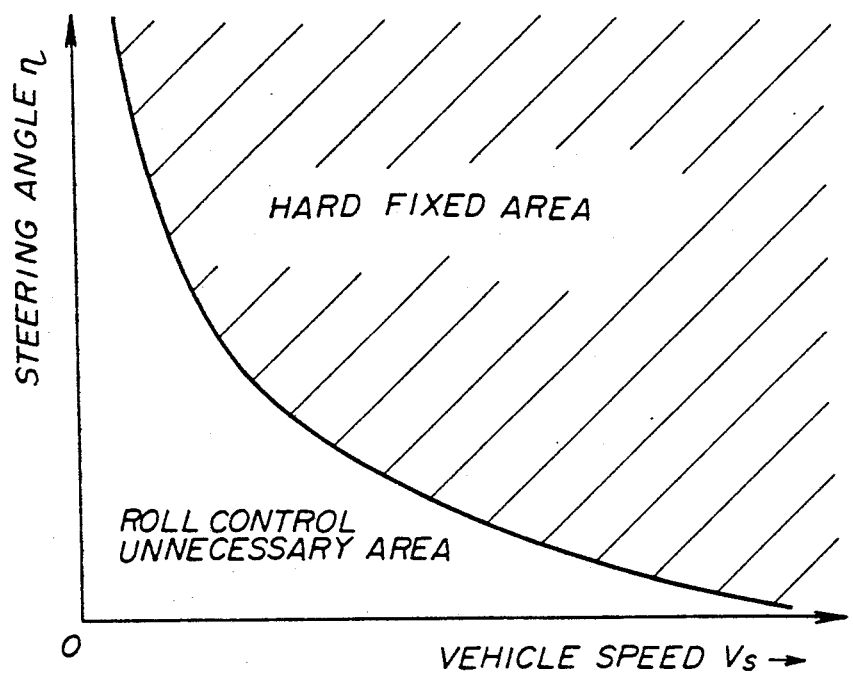
FIG. 17 is a graph showing the relationship between a steering angle and a vehicle speed.

Referring to FIG. 15, at step 600, the CPU 61 inputs the current vehicle speed Vs and the current steering angle η which are represented by the detection signals from the vehicle speed sensor 51 and the steering sensor 55, respectively. At step 610, the CPU 61 calculates a procedure for determining a rolling area from the vehicle speed Vs and the steering angle η. As shown in FIG. 17, a rolling area is a predetermined area based on the relationship between the steering angle η and the vehicle speed Vs. The rolling area is divided into a rolling control unnecessary area and a HARD fixed area. In the rolling control unnecessary area, a predicted rolling is small. In the HARD fixed area, the vehicle speed Vs and/or the steering angle η is somehow great so that a rolling necessary to be suppressed takes place. When the vehicle is rapidly turned or running at high speeds, a rolling within the HARD fixed area will occur.

Turning to FIG. 15, at step 610, the CPU 61 determines whether a predicted tilt of the vehicle obtained from the relationship between the current speed Vs and the steering angle η belongs to the rolling unnecessary area or the HARD fixed area. When it is determined that the predicted tilt belongs to the rolling control unnecessary area, the CPU 61 sets the flag FRL to 0 at step 620. It will be noted that the flag FRL indicates which one of the rolling control unnecessary area and the HARD fixed area the predicted tilt belongs to. Then the control process ends. On the other hand, when the CPU 61 determines that the predicted tilt is in the HARD fixed area, the flag FRL is set to 1 so that the damping force of each of the shock absorbers 2FL and 2FR, for example, is set to the high level (HARD).

A description will now be given of the left front wheel damping force control interrupt process shown in FIG. 16. The interrupt process shown in FIG. 16 is carried out for the left front wheel 5FL. The same interrupt process is carried out for the right front wheel 5FR. In this case, flag FSL shown in FIG. 16 is replaced with flag FLR. At step 710, the CPU 61 determines whether or not the flag FRL is equal to 0. When it is determined that the flag FRL is equal to 0, at step 720, the CPU 61 inputs the damping force change rate VL related to the shock absorber 2FL. At step 730, the CPU 61 determines whether or not the damping force change rate VL is greater than the aforementioned reference value Vref. As has been described previously, the reference value Vref is stored in the ROM 62. The reference value Vref is a fixed value. Alternatively, it is possible to learn an optimum reference value Vref on the basis of the number of times that the shock absorber being considered is switched between SOFT and HARD.

When it is determined, at step 730, that the damping force change rate VL is less than or equal to the reference value Vref, the CPU 61 determines that the current vibration of the vehicle body is small. The control process proceeds to step 740, at which step the CPU 61 determines whether the flag FSL is equal to 1. When the flag FSL is equal to 1, this flag indicates that the damping force of the shock absorber 2FL provided for the left front wheel 5FL is in SOFT. When the flag FSL is equal to 0, the CPU 61 resets it to 0 again at step 750. At step 760, the CPU 61 controls the shock absorber 2FL so that it is continuously maintained in HARD.

The above-mentioned sequence is repeatedly carried out at predetermined intervals as long as the flag FRL is equal to 0, that is, it is not necessary to execute the rolling control. When it is determined, at step 730, that the damping force change rate VL has become greater than the reference value Vref, at step 770, the CPU 61 starts a software timer defined by a timer variable Tb. The timer variable Tb determines how long the shock absorber 2FL is maintained in SOFT from the time when it is switched to SOFT. The value of the timer variable Tb may be constant or decrease with an increase in the vehicle speed Vs.

When V>Vref, the shock absorber 2FL should be in SOFT. Thus, the flag FSL is set to 1 at step 780. At step 790, the CPU 61 controls the shock absorber 2FL through the high-voltage application circuit 75FL (FIG. 14A) so that a voltage of +500 volts is applied to the piezoelectric actuator 27FL. Then the control process ends.

Steps 770–790 are repeatedly carried out during the time when VL>Vref. When the damping force change rate VL has become less than or equal to the reference value Vref, the determination result obtained at step 720 becomes NO. At subsequent step 740, the CPU 61 determines whether or not the flag FSL is equal to 1. In a case where the damping force change rate Vref exceeds the reference value Vref and then becomes less than or equal to the reference value Vref, the flag FSL has been equal to 1. Thus, the determination result at step 740 is YES. At step 800, the CPU 61 determines whether or not the value of the timer variable Tb is less than or equal to 0. When the determination result obtained at step 800 is NO, the value of the timer variable Tb is decremented by +1 at step 810. The shock absorber 2FL is continuously maintained in SOFT at step 790.

On the other hand, the control process proceeds to step 820 when the time defined by the timer variable Tb elapses from the time when it is determined VL≦Vref at step 720. At step 820, the timer variable Tb is reset to 0, and step 750 is executed. At step 760, the damping force of the shock absorber 2FL is switched to HARD. In this step, a voltage of −100 volts is applied to the piezoelectric actuator 27FL (FIG. 14A) so that it is contracted. Then the control process ends.

As has been described above, in the case where the predicted rolling is small (FRL=0), the damping force of the shock absorber 2FL provided for the left front wheel 5FL is switched to SOFT (low level) immediately after the damping force change rate VL has become greater than the reference value Vref. Further, the damping force of the shock absorber 2FL is continuously maintained in SOFT during the predetermined time (corresponding to the timer variable Tb) from the time when the damping force change rate VL has become less than or equal to the reference value Vref. After that, the damping force of the shock absorber 2FL is switched to HARD (high level).

On the other hand, when a great rolling which is necessary to be suppressed takes place, the flag FRL is set to 1 at step 630 (FIG. 15). Thus, the determination result obtained at step 710 becomes NO. The CPU 61 executes step 850, at which step it is determined whether the flag FSR related to the right front wheel 5FR is equal to 1. The flag FSR is maintained at 1 during the time when the damping force of the shock absorber 2FR is in SOFT in the control process thereof in the same way as the aforementioned flag FSL. When FSR=0, that is, the damping force of the shock absorber 2FR is in HARD, the control process proceeds to step 720. On the other hand, when the damping force of the shock absorber 2FR is in SOFT (FSR =1), the CPU 61 executes steps 750 and 760.

It will be noted that the shock absorber 2FR is controlled by the control process shown in FIG. 16 in the same way as the shock absorber 2FL. In the case where the shock absorber has already been set to SOFT, the shock absorber 2FR is switched and fixed to HARD.

According to the third embodiment of the present invention, various advantages are obtained. In the case where vehicle is traveling straight or at low speeds, the predicted roll is small. In this case, when the damping force change rate V exceeds the reference value Vref, the shock absorber 2 is immediately switched to SOFT and maintained during the predetermined time (Tb) from that time. With this control, it becomes possible to improve ride comfort. When the steering is turned right so that lateral force is exerted on the vehicle (FRL=1), the shock absorber being considered is switched to and maintained in HARD when a different one of the shock absorbers in the same group has already been in SOFT, and on the other hand, the shock absorber being considered is controlled on the basis of the damping force change rate V when a different one of the shock absorbers in the same group has already been in HARD. That is, one of the shock absorbers in the same group is controlled to HARD without exception when a rolling to be suppressed takes place and the other shock absorber (absorbers) is controlled on the basis of the damping force change rate V. With this control, it becomes possible to improve drive comfort at high stability and controllability.

Figure 18:
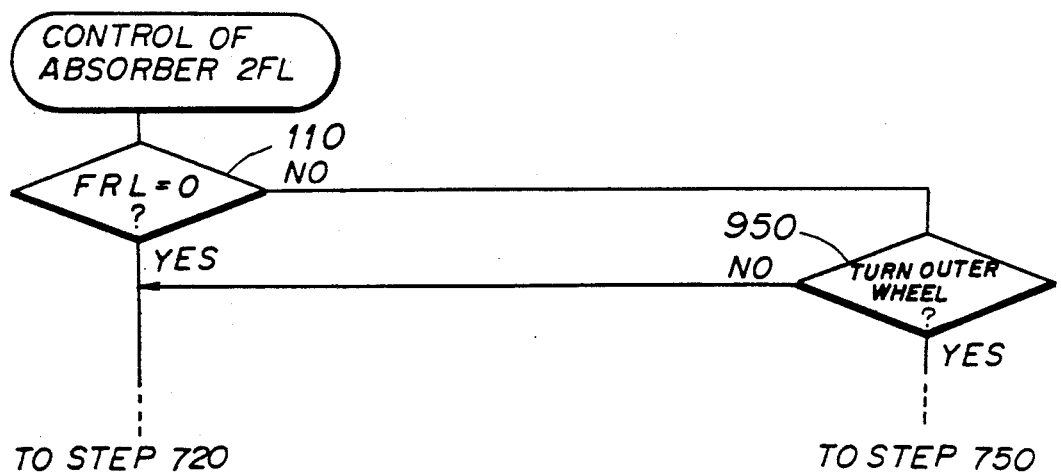
FIG. 18 is a flowchart of an essential part of a control process of a variation of the third embodiment of the present invention.

A description will now be given of a variation of the third embodiment of the present invention with reference to FIG. 18. The variation of the third embodiment is the same as the third embodiment except that step 950 shown in FIG. 18 is substituted for step 850 shown in FIG. 16. At step 950, the CPU 61 determines whether or not the wheel being considered is the turn outer wheel. When the steering is turned right, the left front wheel 2FL is the turn outer wheel. In this case, the shock absorber 2FL for the wheel 5FL is controlled to HARD. Thus, the wheel serving as the turn outer wheel is always controlled to HARD so that stability and controllability can be improved.

In the variation shown in FIG. 18, it is also possible to set the shock absorber 2 related to a turn inner wheel to HARD when the occurrence of a rolling to be suspended is predicted. This is due to the fact that the shock absorber on the extension side has a damping force than the shock absorber on the contraction side. It is also possible to control the shock absorbers by detecting a tilt of the vehicle in the longitudinal direction coupled to the front and rear sides of the vehicle, such as a dive or squat so that at least one of the suspensions in the same group is set to HARD.

It will be noted that the above-mentioned third embodiment of the present invention can be combined with the aforementioned second embodiment of the present invention. That is, the damping force of each shock absorber is controlled by detecting a rolling of the vehicle and the rapidly accelerating state or braking state. In this case, when both the rolling state and the rapidly accelerating or braking state are detected at the same time, the shock absorbers 2 are controlled so that the shock absorbers in the same group are maintained in the same condition. That is, the control according to the second embodiment of the present invention has priority to the control according to the third embodiment. This is due to the fact that the attitude of the vehicle occurs greatly when the vehicle which is turning is in the rapidly accelerating state or braking state. Thus, safety is given priority to ride comfort.

The present invention is not limited to the specifically described embodiments, and variations and modifications may be made without departing from the scope of the present invention. For example, it is possible to employ a shock absorber which is switchable among SOFT, HARD and SPORT. SPORT denotes an intermediate state between SOFT and HARD or a different type of shock absorber in which the damping force thereof can be successively changed.

What is claimed is:

1. A suspension control system for controlling suspensions provided for wheels of a vehicle, said wheels being a left front wheel, a right front wheel, a left rear wheel and a right rear wheel, said suspension control system comprising:

driving condition detecting means for detecting a driving condition of said vehicle;

determination means, coupled to said driving condition detecting means, for determining whether or not said driving condition coincides with a predetermined driving condition, said suspensions being grouped into a plurality of groups, said groups being a first group comprising said left front wheel and said right front wheel and a second group comprising said left rear wheel and said right rear wheel; and control means, coupled to said suspensions and said determination means, for separately controlling said suspensions of said left front wheel, said right front wheel, said left rear wheel and said right rear wheel when said determination means determines that said driving condition detected by said driving condition detecting means does not coincide with said predetermined driving condition and for controlling said suspensions of each of said first and second groups, when said determination means determines that said driving condition coincides with said predetermined driving condition, so that said suspension related to said right front wheel is set to a condition identical to said suspension related to said left front wheel and said suspension related to said right rear wheel is set to a condition identical to said suspension related to said left rear wheel.

2. A suspension control system for controlling suspensions provided for wheels of a vehicle, said suspension control system comprising:

driving condition detecting means for detecting a driving condition of said vehicle, said driving condition detecting means comprising vibration detecting means for detecting a vibration of said vehicle;

determination means, coupled to said driving condition detecting means, for determining whether said driving condition coincides with a predetermined driving condition, said suspensions being grouped into a plurality of groups; and control means, coupled to said suspensions and said determination means, for separately controlling said suspensions in accordance with said vibration detected by said vibration detecting means of said driving condition when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition.

3. A suspension control system for controlling suspensions provided for wheels of a vehicle, said suspension control system comprising:

driving condition detecting means for detecting a driving condition of said vehicle, said driving condition detecting means comprising vehicle speed detecting means for detecting a vehicle speed of said vehicle;

determination means, coupled to said driving condition detecting means, for determining whether said driving condition coincides with a predetermined driving condition, said suspensions being grouped into a plurality of groups, said determination means comprising vehicle speed determination means for determining whether said vehicle speed exceeds a reference vehicle speed which corresponds to said predetermined driving condition; and control means, coupled to said suspensions and said determination means, for separately controlling said suspensions in accordance with said driving condition when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition.

4. A suspension control system for controlling suspensions provided for wheels of a vehicle, said suspension control system comprising:

driving condition detecting means for detecting a driving condition of said vehicle, said driving condition detecting means comprises vehicle speed detecting means for detecting a vehicle speed of said vehicle;

determination means, coupled to said driving condition detecting means, for determining whether said driving condition coincides with a predetermined driving condition, said suspensions being grouped into a plurality of groups, said predetermined driving condition being said vehicle speed, said vehicle speed including three speed ranges, said three speed ranges being a predetermined low-speed range, a predetermined high-speed range and a predetermined-intermediate speed range, said determination means comprising vehicle speed determination means for determining to which one of said three speed ranges said vehicle speed detected by said vehicle speed detecting means belongs; and control means, coupled to said suspensions and said determination means, for separately controlling said suspensions in accordance with said driving condition when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition, said control separately controlling said suspensions when said vehicle speed is in said predetermined high-speed range and controlling said suspensions for each of said groups when said vehicle speed in said predetermined low-speed range, said control means further comprising means, operating when said vehicle speed is in said predetermined intermediate-speed range, for controlling said suspensions in a predetermined one of said groups so that said suspensions in said predetermined one of the groups are set to the identical condition and for separately controlling said suspension in said groups other than said predetermined one of said groups.

5. A suspension control system as claimed in claim 4, wherein:

said wheels has a left front wheel, a right front wheel, a left rear wheel and a right rear wheel;

said suspensions are grouped into a first group composed of said left front wheel and said right front wheel and a second group composed of said left rear wheel and said right rear wheel; and said means of said control means controls said suspensions related to said left rear wheel and said right rear wheel so that said suspensions related to said right rear wheel and said left rear wheel are set to the identical condition and separately controls said suspensions related to said right front wheel and said left front wheel.

6. A suspension control system for controlling suspensions provided for wheels of a vehicle, each of said suspensions including a shock absorber providing a damping force which is switchable between a high level and a low level, said suspension control system comprising:

driving condition detecting means for detecting a driving condition of said vehicle;

determination means, coupled to said driving condition detecting means, for determining whether said driving condition coincides with a predetermined driving condition, said suspensions being grouped into a plurality of groups; and control means, coupled to said suspensions and said determination means, for separately controlling said suspensions in accordance with said driving condition when said determination means determines that said driving condition does not coincide with said predetermined driving condition, for controlling said suspensions for each of said groups so that said suspensions in an identical group are set to an identical condition when said determination means determines that said driving condition coincides with said predetermined driving condition such that said shock absorbers of said suspensions in the identical group are set to said low level when at least one of said shock absorbers in the identical group is in the low level.

7. A suspension control system as claimed in claim 6, wherein said control means controls said suspensions so that said shock absorbers of said suspensions in the identical group are maintained at the low level during a predetermined time from a time when at least one of said shock absorbers in the identical group is set to the low level.

8. A suspension control system for controlling suspensions provided for wheels of a vehicle, said suspension control system comprising:
   driving condition detecting means for detecting a driving condition of said vehicle;
   determination means, coupled to said driving condition detecting means, for determining whether said driving condition coincides with a predetermined driving condition, said suspensions being grouped into a plurality of groups, said determination means comprising acceleration determination means for determining whether said vehicle is in a predetermined accelerating state; and
   control means, coupled to said suspensions and said determination means, for separately controlling said suspensions in accordance with said driving condition when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition such that said acceleration determination means of said determination means determines that said vehicle is in said predetermined accelerating state.

9. A suspension control system as claimed in claim 8, wherein:
   said driving condition detecting means comprises sensor means for detecting an open angle of a throttle valve provided in said vehicle;
   said determination further means comprises means for determining whether or not said open angle of the throttle valve detected by said sensor means is greater than a reference angle; and
   said vehicle is in said predetermined accelerating state when said open angle is greater than said reference angle.

10. A suspension control system for controlling suspensions provided for wheels of a vehicle, each of said suspensions including a shock absorber providing a damping force, said damping force being switchable between a high level and a low level, said suspension control system comprising:
   driving condition detecting means for detecting a driving condition of said vehicle, said driving condition detecting means comprising damping force change rate detecting means for detecting a rate of change in the damping force of the shock absorber included in each of said suspensions;
   determination means, coupled to said driving condition detecting means, for determining whether said driving condition coincides with a predetermined driving condition, said suspensions being grouped into a plurality of groups; and
   control means, coupled to said suspensions and said determination means, for separately controlling said suspensions in accordance with said rate of change in the damping force of the shock absorber included in each of said suspensions, said rate of change being indicative of said driving condition, said control means controlling said suspensions when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition.

11. A suspension control system as claimed in claim 10, wherein said control means comprises:
   comparing means for comparing said rate of change in the damping force of each of the shock absorbers with a predetermined reference value and for outputting a comparison result;
   first setting means for setting one of said shock absorbers in the identical group to one of said low level and said high level on the basis of said comparison result; and
   second setting means for setting said shock absorbers in the identical group except sad one of the shock absorbers to said one of the low level and the high level which is set by said first setting means.

12. A suspension control system for controlling suspensions provided for wheels of a vehicle, each of said suspensions comprising a spring having a spring constant switchable between predetermined levels, said suspension control system comprising:
   driving condition detecting means for detecting a driving condition of said vehicle;
   determination means, coupled to said driving condition detecting means, for determining whether said driving condition coincides with a predetermined driving condition, said suspensions being grouped into a plurality of groups;
   control means, coupled to said suspensions and said determination means, for separately controlling said suspensions in accordance with said driving condition when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition, said control means comprising change means for changing the spring constant of said spring in accordance with said driving condition.

13. A suspension control system for controlling suspensions provided for wheels of a vehicle, said suspension control system comprising:
   driving condition detecting means for detecting a driving condition of said vehicle, said driving condition detecting means comprising sensor means for detecting a pressure of a brake oil in a braking unit provided in said vehicle;
   determination means, coupled to said driving condition detecting means, for determining whether said driving condition coincides with a predetermined driving condition, said suspensions being grouped into a plurality of groups, said determination means comprising brake determination means for determining whether said vehicle is in a predetermined braking state, said determination means further comprising brake oil detection means for determining whether or not said pressure of the brake oil exceeds a reference pressure level, said vehicle being in said predetermined braking state when said brake oil detection means of said determination means determines that said pressure of the brake oil exceeds said reference pressure level; and control means, coupled to said suspensions and said determination means, for separately controlling said suspensions in accordance with said driving condition when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition such that said brake determination means of said determination means determines that said vehicle is in said predetermined braking state.

14. A suspension control system for controlling suspensions provided for wheels of a vehicle, said suspension control system comprising:

driving condition detecting means for detecting a driving condition of said vehicle, said driving condition detecting means comprising sensor means for generating a detection signal when a brake pedal provided in said vehicle is depressed;

determination means, coupled to said driving condition detecting means, for determining whether said driving condition coincides with a predetermined driving condition, said suspensions being grouped into a plurality of groups, said determination means comprising brake determination means for determining whether said vehicle is in a predetermined braking state, said determination means further comprising detection signal detecting means for determining whether or not said sensor means has generated said detection signal, said vehicle being in said predetermined braking state when said detection signal detecting means of said determination means determines that said sensor means has generated said detection signal; and control means, coupled to said suspensions and said determination means, for separately controlling said suspensions in accordance with said driving condition when said determination means determines that said driving condition does not coincide with said predetermined driving condition and for controlling said suspensions for each of said groups so that said suspensions in an identical group are set to an identical condition when said determination means determines that said driving condition coincides with said predetermined driving condition such that said brake determination means of said determination means determines that said vehicle is in said predetermined braking state.

15. A suspension control system for controlling suspensions provided for wheels of a vehicle, said suspension control system comprising:

driving condition detecting means for detecting a driving condition of said vehicle;

determination means, coupled to said driving condition detecting means, for determining whether or not said driving condition detected by said driving condition detecting means coincides with a predetermined driving condition, said suspensions being grouped into a plurality of groups, each of said suspensions being switchable between a hard state and a soft state;

control means, coupled to said suspensions and said determination means, for separately controlling said suspensions on the basis of said driving condition when said determination means determines that said driving condition does not coincide with said predetermined driving condition and for controlling said suspensions for each of said groups so that at least one of said suspensions in an identical group is set to said hard state when said determination means determines that said driving condition coincides with said predetermined driving condition.

16. A suspension control system as claimed in claim 15, wherein said control means controls said suspensions for each of said groups so that one of said suspensions in the identical group related to one of said wheels which is an outer wheel obtained when said vehicle is being turned is set to said hard state when said determination means determines that said driving condition coincides with said predetermined driving condition.

17. A suspension control system as claimed in claim 15, wherein:

each of said suspensions comprises a spring having a spring constant switchable between predetermined levels;

said control means comprises change means for changing the spring constant of said spring on the basis of said driving condition.

18. A suspension control system as claimed in claim 15, wherein said determination means comprises:

predicting means for predicting a tilt of said vehicle from said driving condition detected by said driving condition detecting means; and means for determining whether or not said tilt of the vehicle is greater than a predetermined level, and wherein:

said control means controls said suspensions for each of said groups so that at least one of said suspensions in the identical group is set to said hard state when said means of said determination means determines that said tilt of the vehicle is greater than said predetermined level.

19. A suspension control system as claimed in claim 15, wherein:

said driving condition detecting means comprises rolling detection means for detecting a rolling of said vehicle;

said determination means comprises means for determining whether or not said rolling of the vehicle detected by said rolling detection means is greater than a predetermined rolling level; and said control means controls said suspensions for each of said groups so that at least one of said suspensions in the identical group is set to said hard state when said means of said determination means determines that said rolling of the vehicle is greater than said predetermined rolling level.

20. A suspension control system as claimed in claim 19, wherein said determination means comprises:
first means for determining whether or not said vehicle is in a predetermined accelerating state;
second means for detecting whether or not said vehicle is in a predetermined braking state, and wherein:
said control means comprises means for controlling said suspensions for each of said groups so that said suspensions in the identical group are set to an identical condition when either one of said predetermined accelerating state or said predetermined braking state is detected at the same time as said rolling detection means detects the rolling of said vehicle.

21. A suspension control system as claimed in claim 19, wherein when said rolling of the vehicle detected by said rolling detection means is less than or equal to said predetermined rolling level, said control means separately controls said suspensions on the basis of said driving conditions detected by said driving condition detecting means.

22. A suspension control system as claimed in claim 15, wherein:
said driving condition detecting means comprises vibration detecting means for detecting a vibration of said vehicle; and
said control means controls said suspensions on the basis of said vibration detected by said vibration detecting means.

23. A suspension control system as claimed in claim 15, wherein said control means controls said suspensions so that said suspensions are maintained in said soft state during a predetermined time from a time when said shock absorbers are set to said soft state.

24. A suspension control system as claimed in claim 15, wherein said driving condition detecting means comprises:
speed detecting means for detecting a vehicle speed of said vehicle; and
steering angle detecting means for detecting a turned angle of a steering provided in said vehicle, and wherein:
said predetermined driving condition is based on said vehicle speed and said turned steering angle.

25. A suspension control system as claimed in claim 15, wherein:
each of said suspensions has a shock absorber providing a damping force switchable between predetermined levels; and
said control means comprises change means for changing the damping force of said shock absorber on the basis of said driving condition.

* * * * *